Jan. 18, 1944. R. O. HENSZEY ET AL 2,339,638
METHOD AND APPARATUS FOR DETECTING DEFECTS IN FILLED CANS
Filed May 27, 1939 15 Sheets-Sheet 1
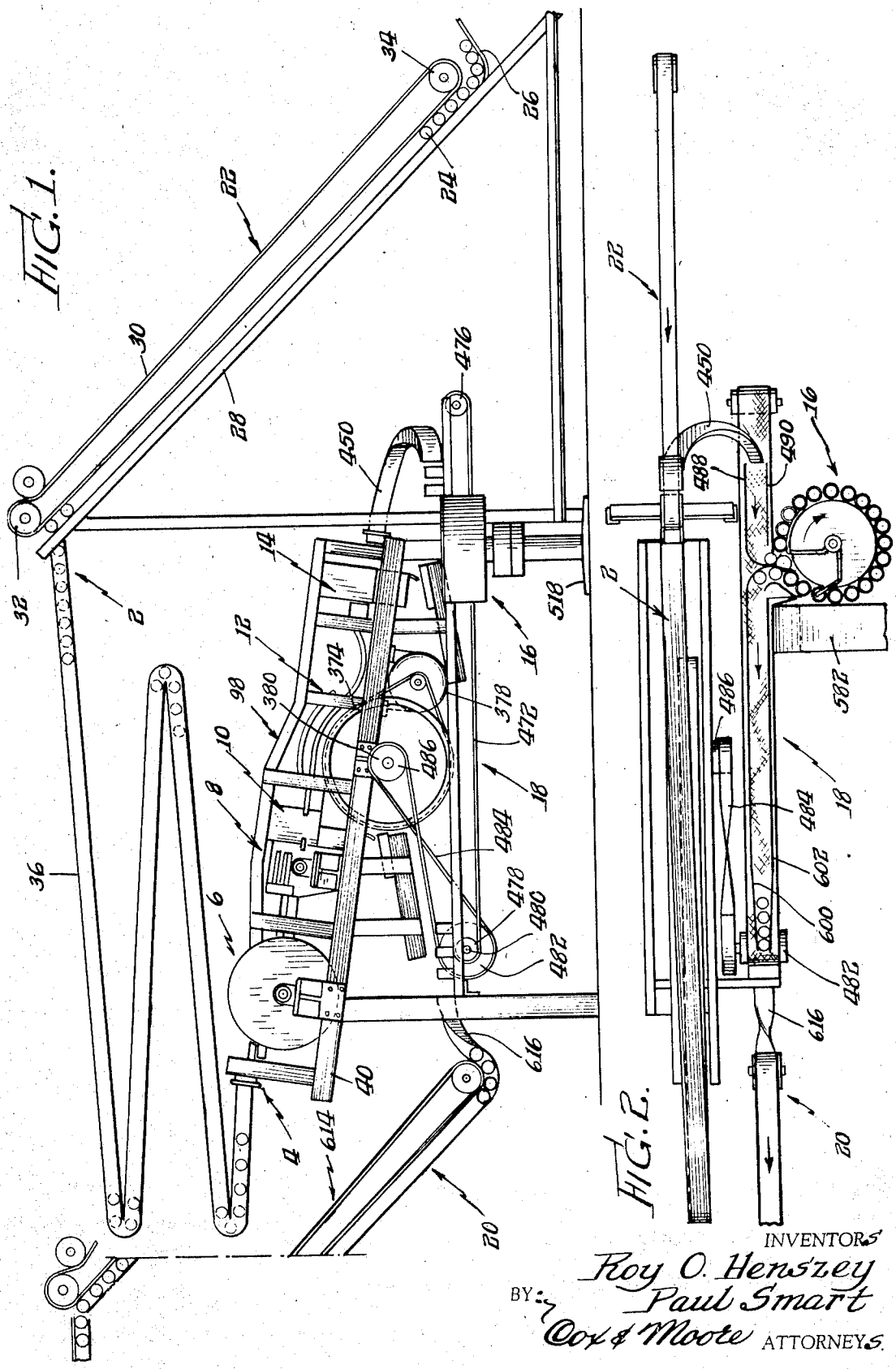
INVENTORS
Roy O. Henszey
Paul Smart
BY: Cox & Moore ATTORNEYS Jan. 18, 1944. R. O. HENSZEY ET AL 2,339,638
METHOD AND APPARATUS FOR DETECTING DEFECTS IN FILLED CANS
Filed May 27, 1939 15 Sheets-Sheet 2
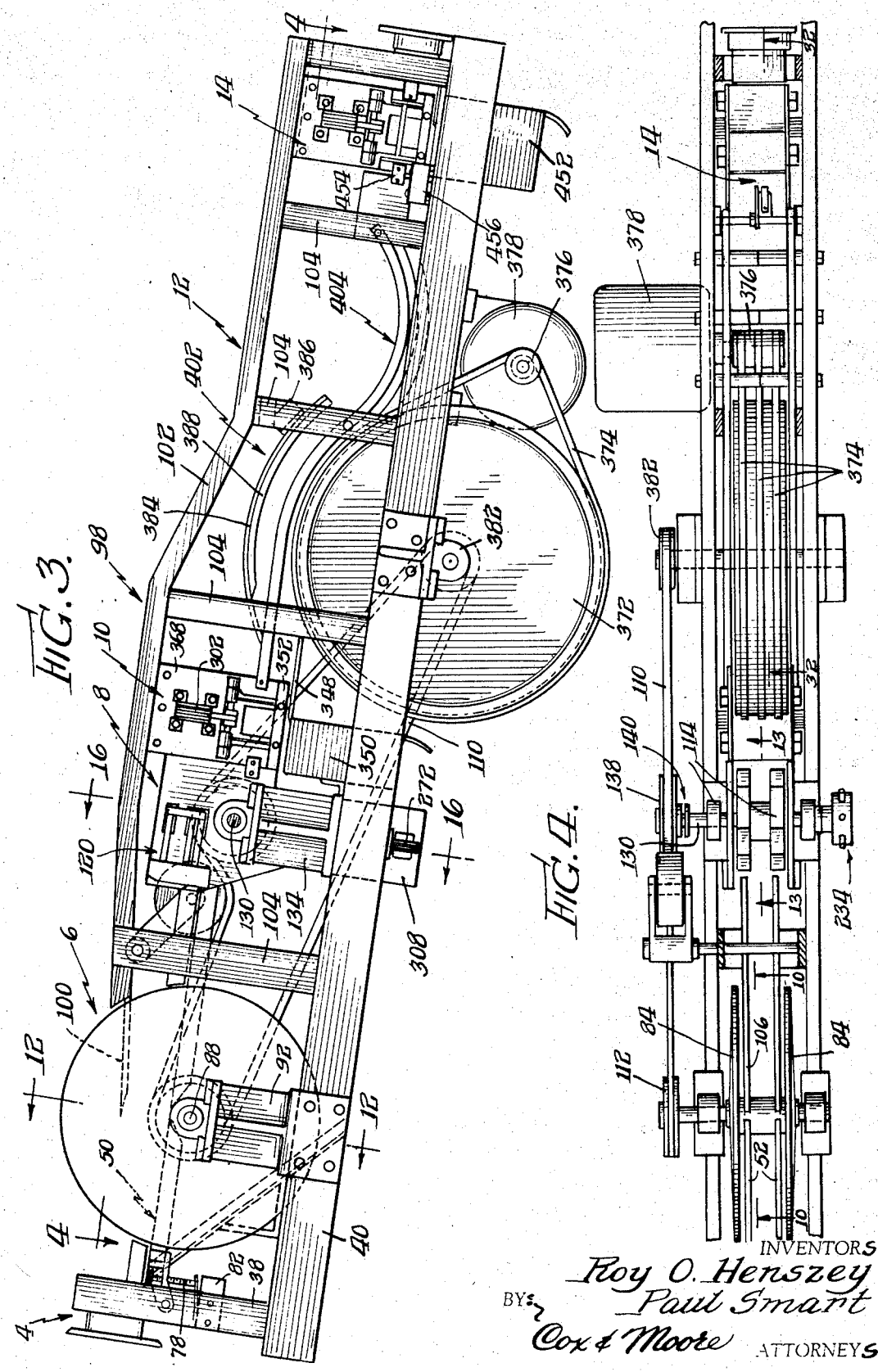
INVENTORS
Roy O. Henszey
Paul Smart
BY: Cox & Moore ATTORNEYS

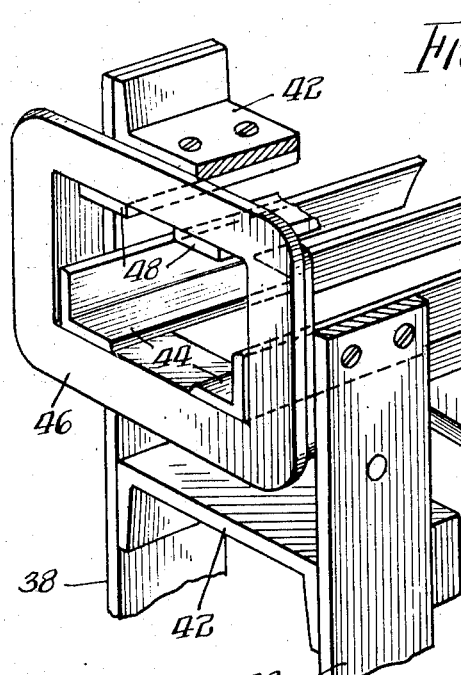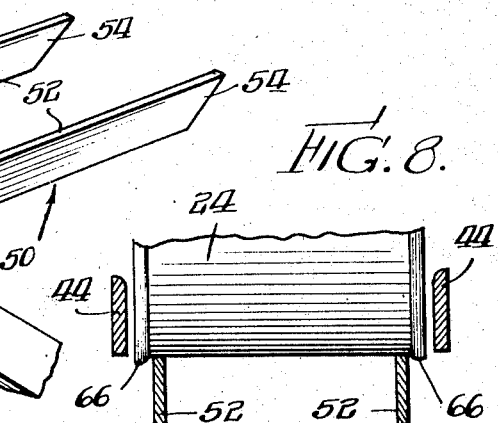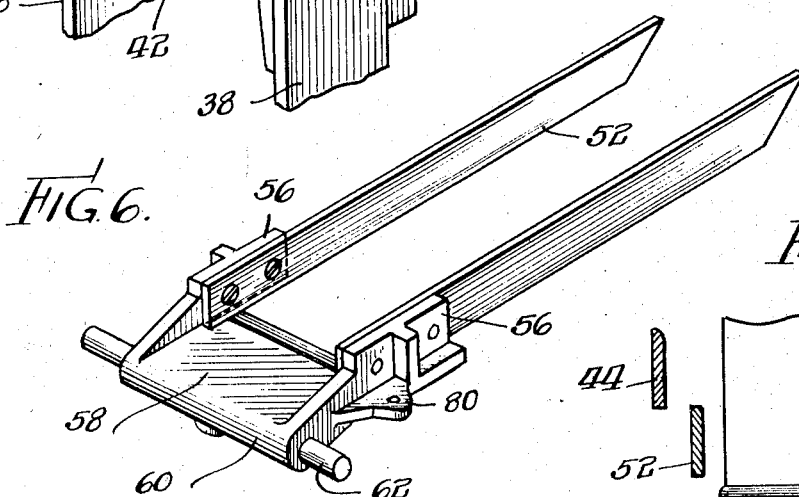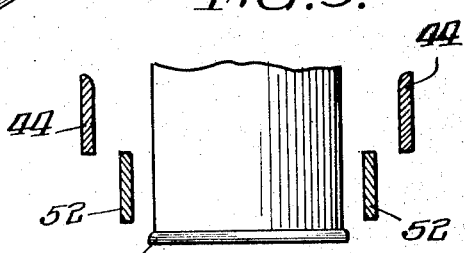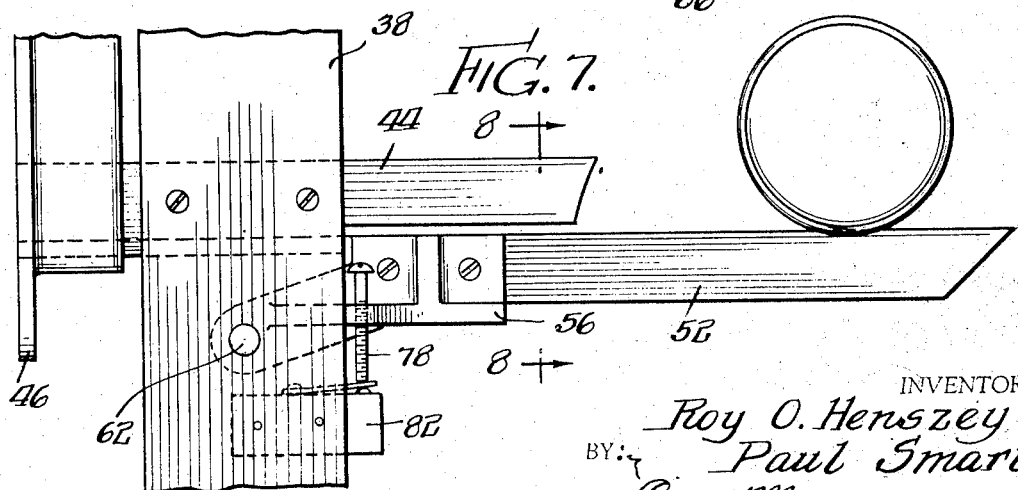

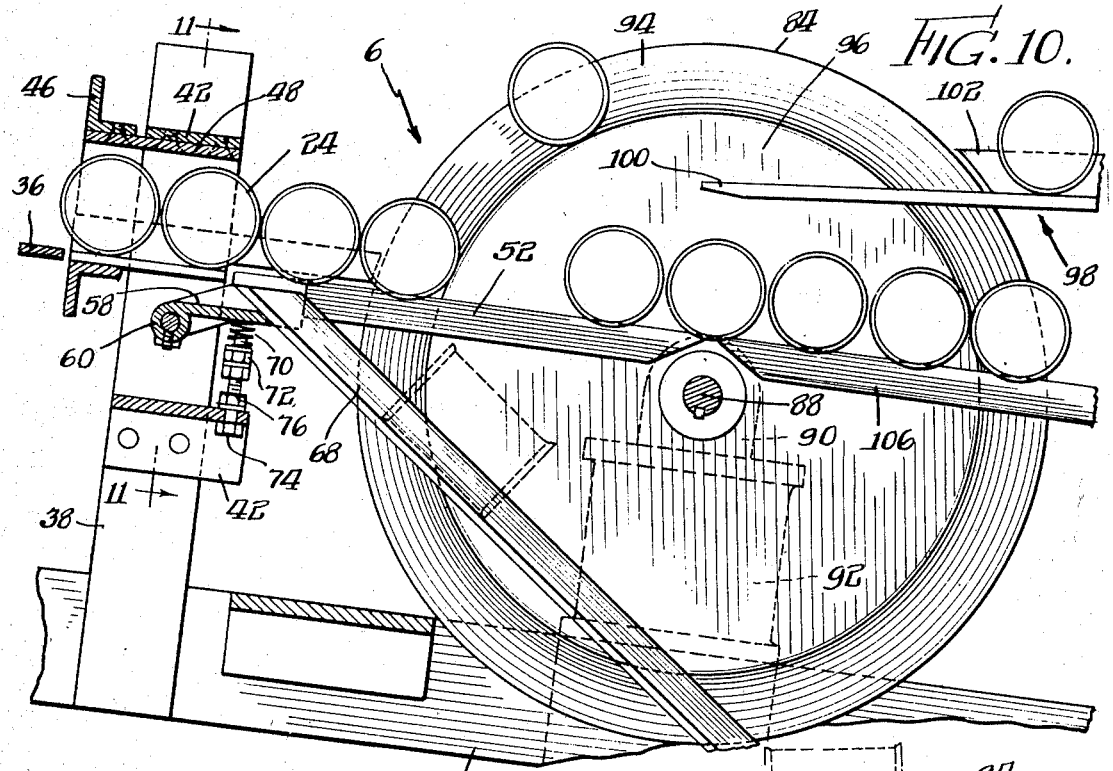
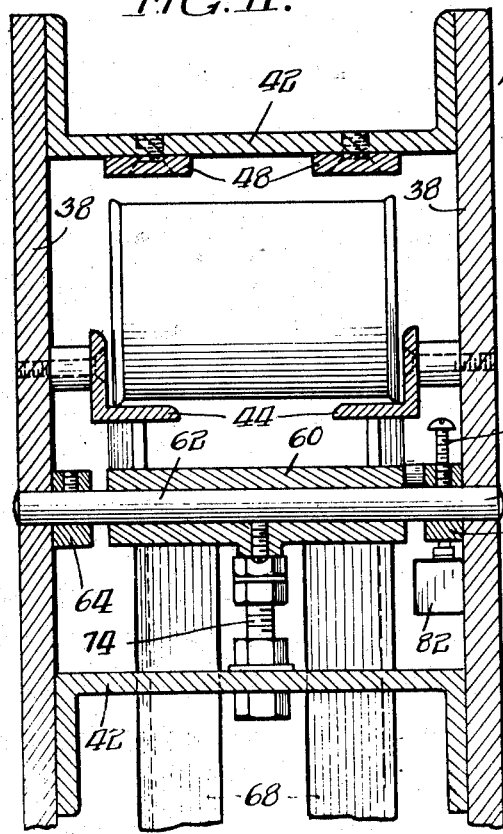
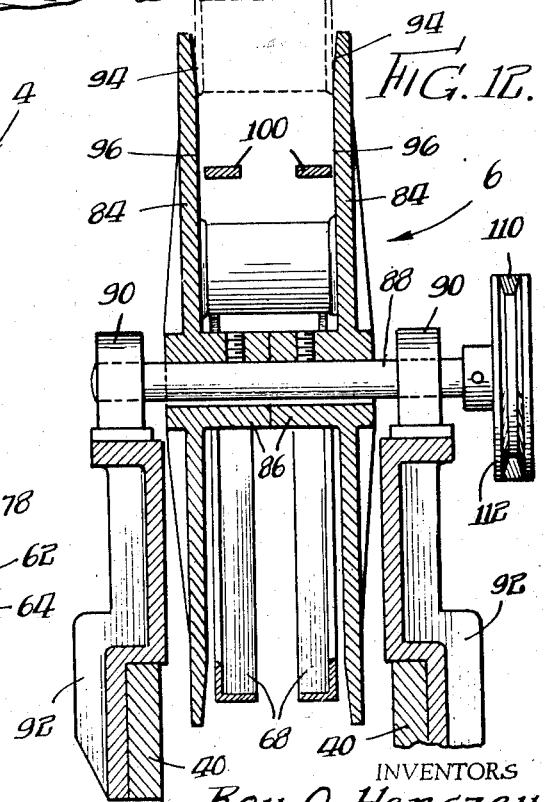

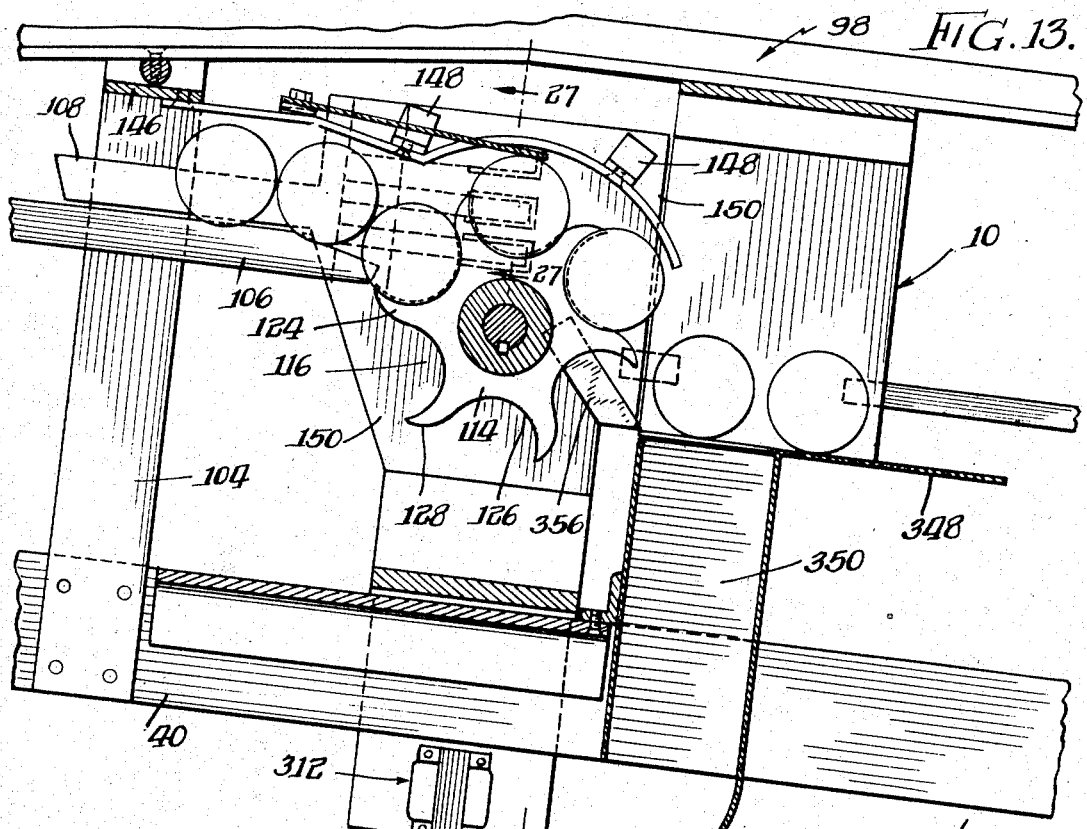
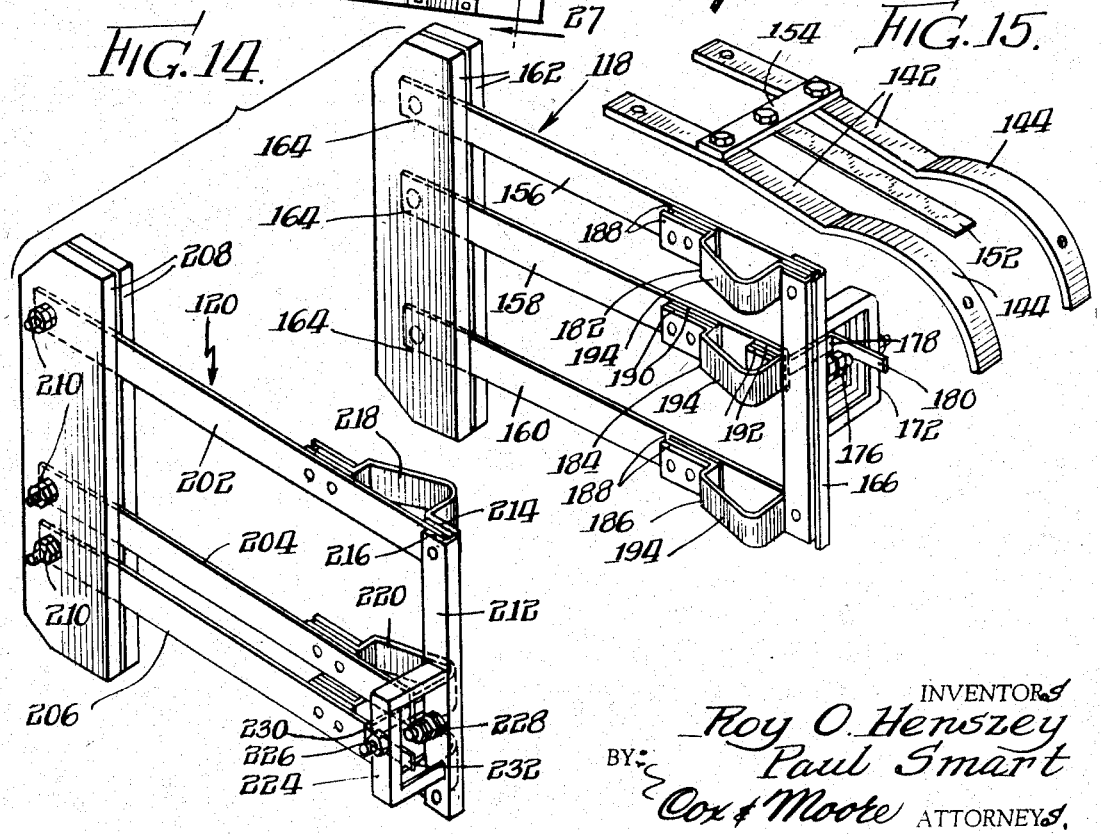

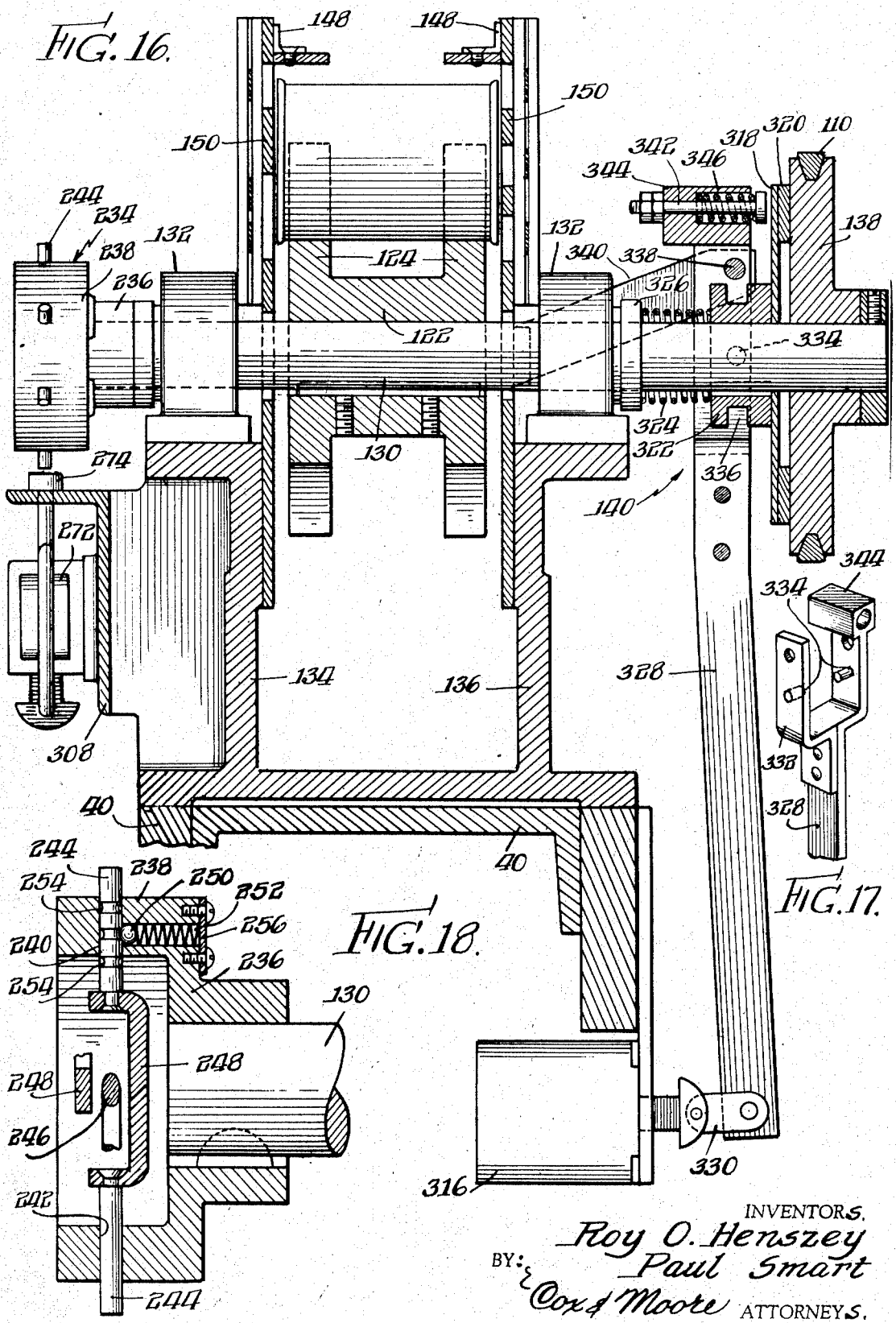

Jan. 18, 1944.  R. O. HENSZEY ET AL  2,339,638
METHOD AND APPARATUS FOR DETECTING DEFECTS IN FILLED CANS
Filed May 27, 1939   15 Sheets-Sheet 7

INVENTORS.
Roy O. Henszey
Paul Smart
BY Cox & Moore ATTORNEYS.

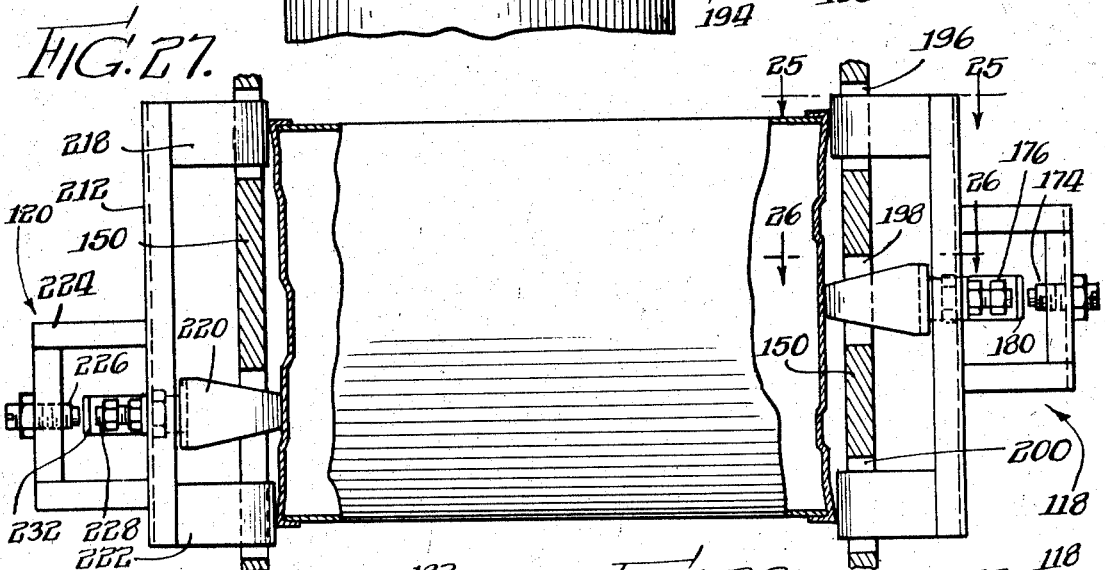

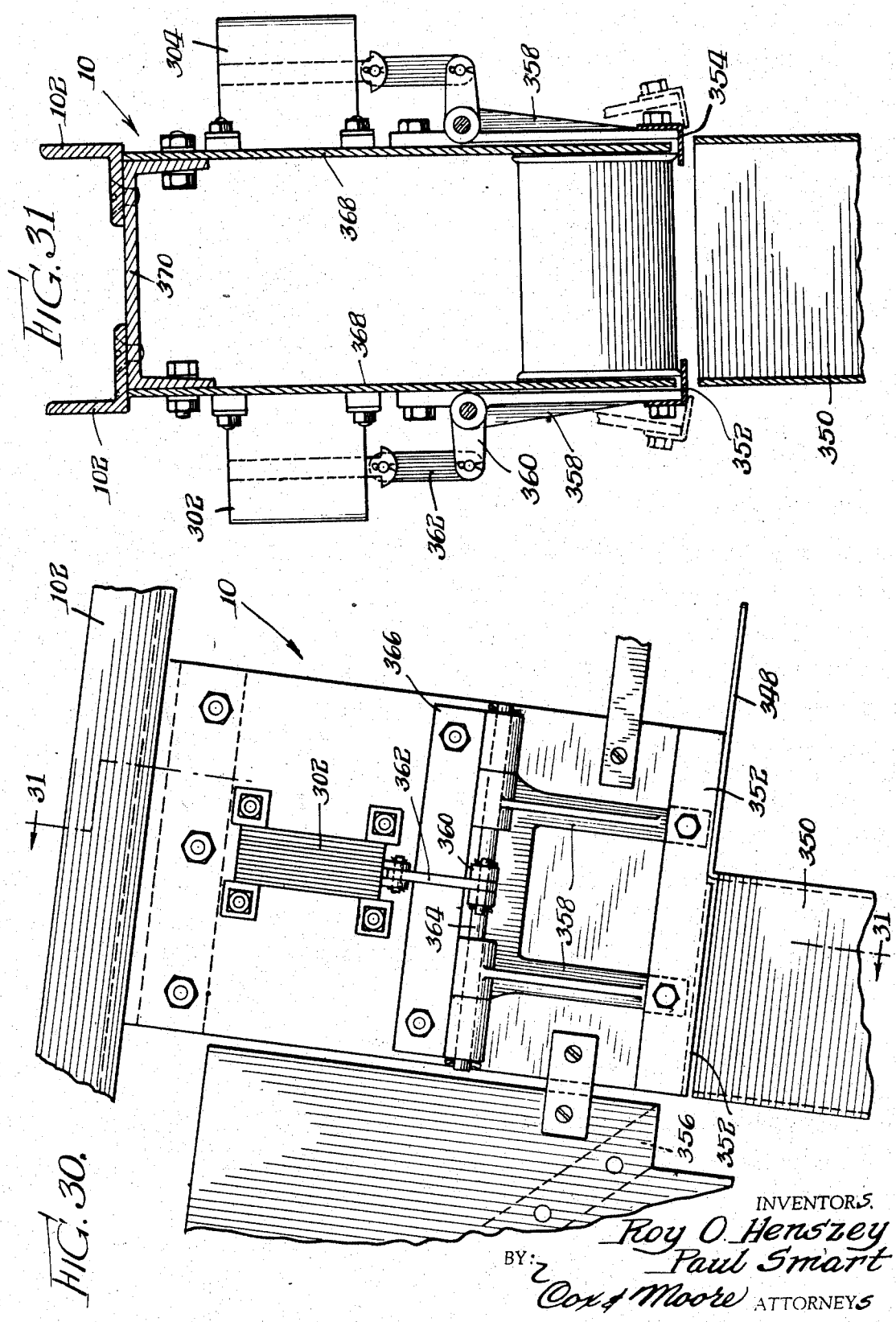

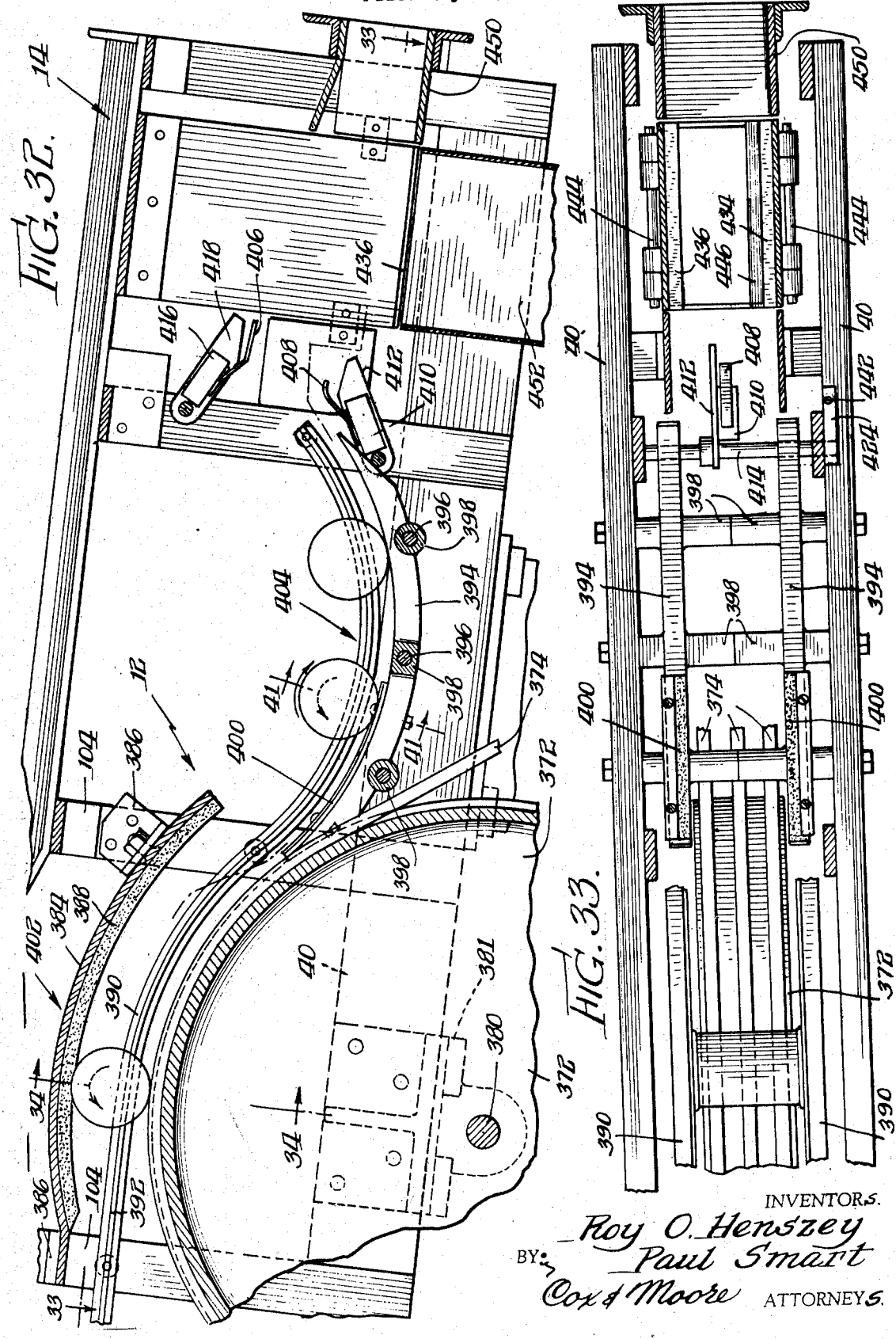
Jan. 18, 1944. R. O. HENSZEY ET AL 2,339,638
METHOD AND APPARATUS FOR DETECTING DEFECTS IN FILLED CANS
Filed May 27, 1939 15 Sheets-Sheet 10
INVENTORS.
Roy O. Henszey
Paul Smart
BY Cox & Moore ATTORNEYS.

Jan. 18, 1944.  R. O. HENSZEY ET AL  2,339,638
METHOD AND APPARATUS FOR DETECTING DEFECTS IN FILLED CANS
Filed May 27, 1939  15 Sheets-Sheet 11
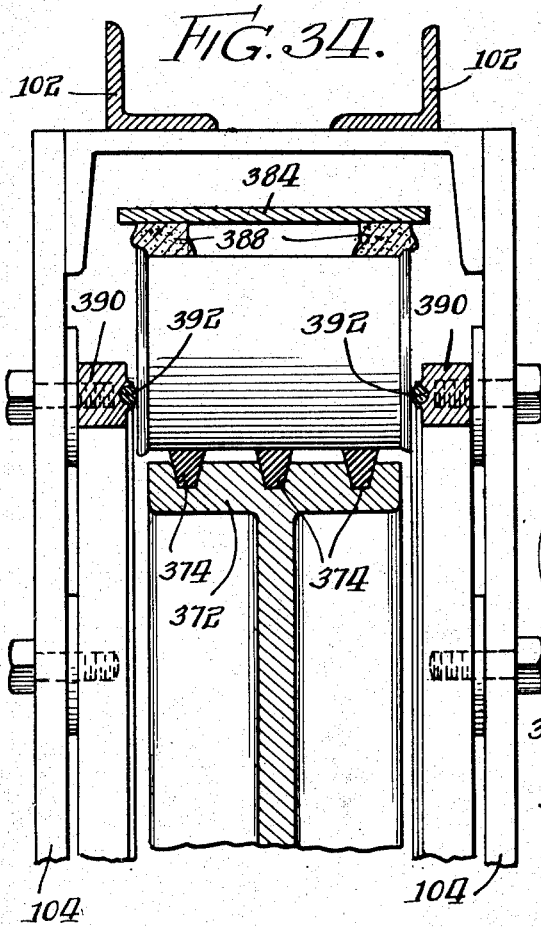
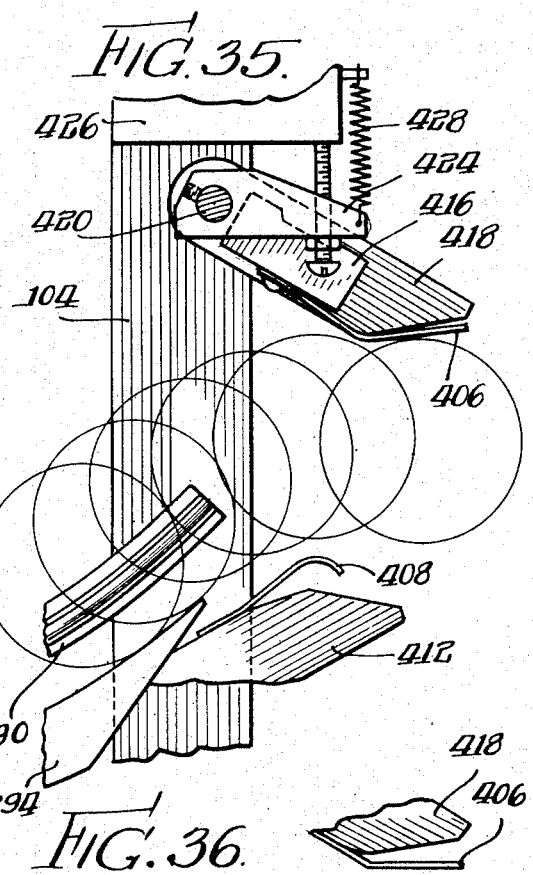
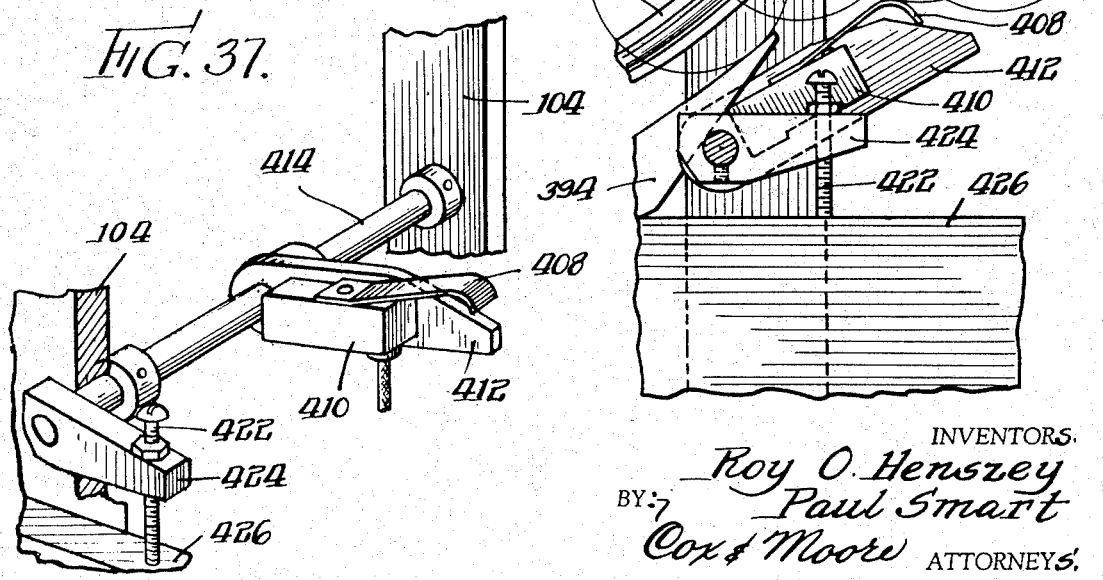
INVENTORS.
Roy O. Henszey
Paul Smart
BY Cox & Moore  ATTORNEYS.

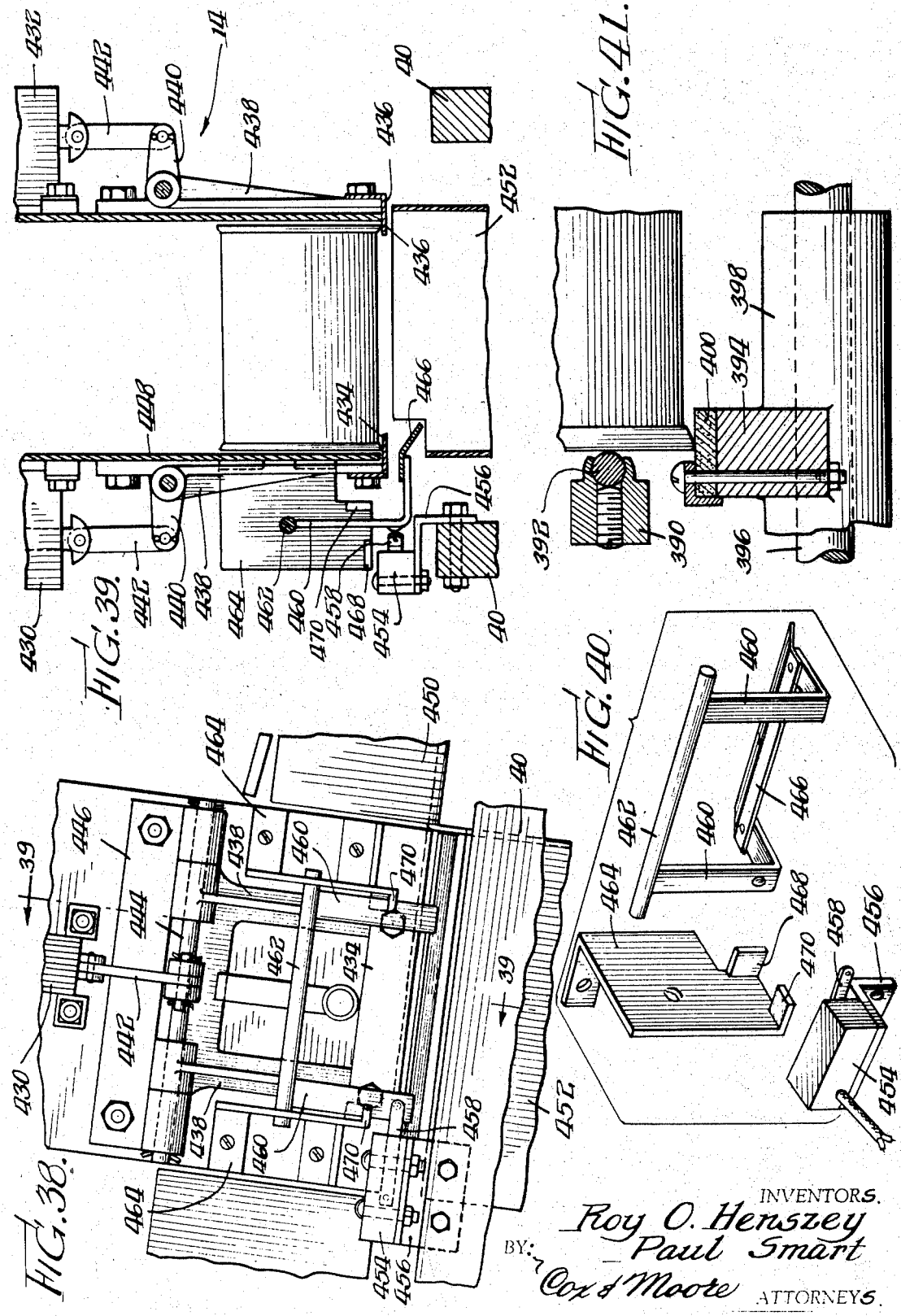

Jan. 18, 1944. R. O. HENSZEY ET AL 2,339,638
METHOD AND APPARATUS FOR DETECTING DEFECTS IN FILLED CANS
Filed May 27, 1939 15 Sheets-Sheet 13

INVENTORS
Roy O. Henszey
Paul Smart
BY Cox & Moore ATTORNEYS

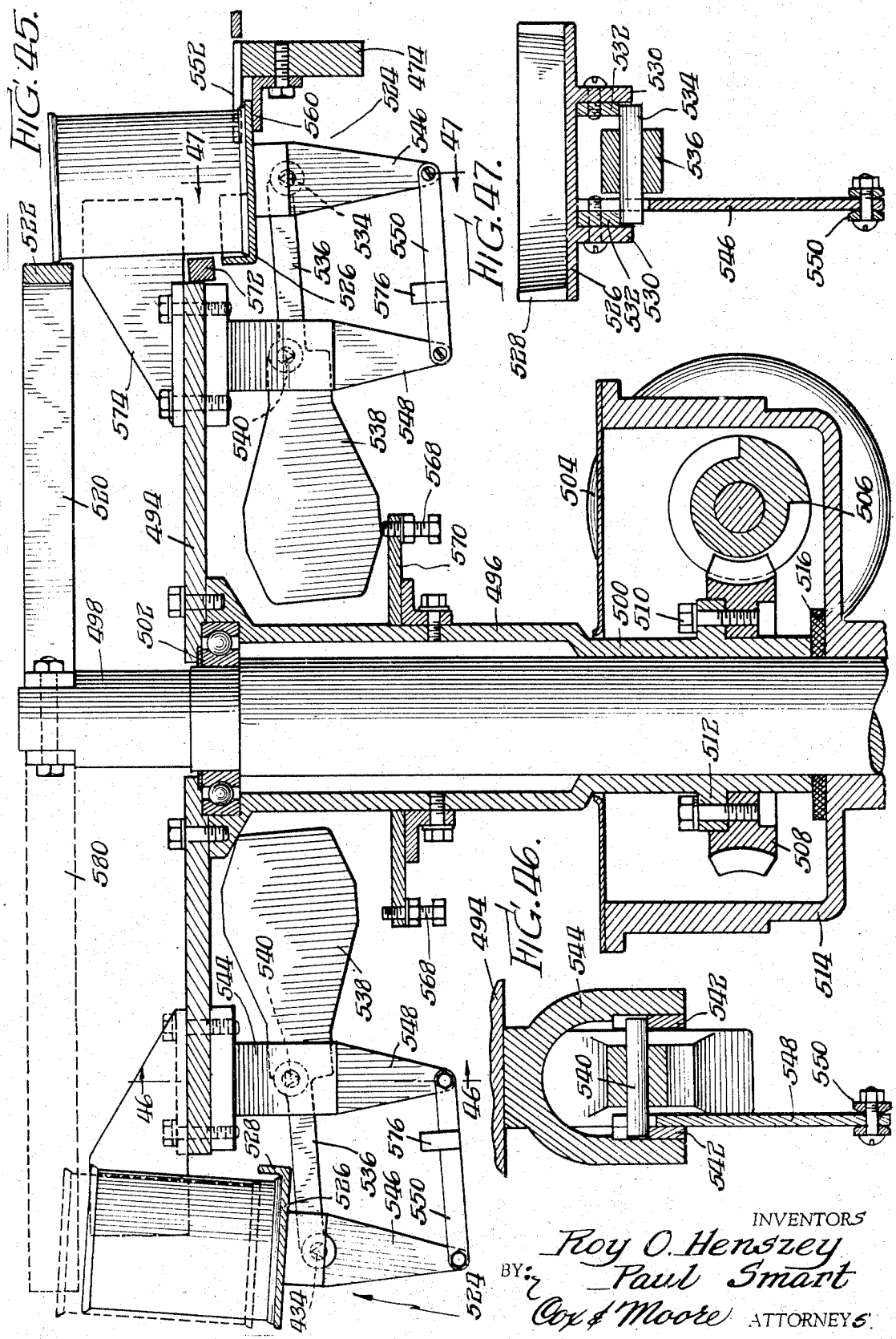

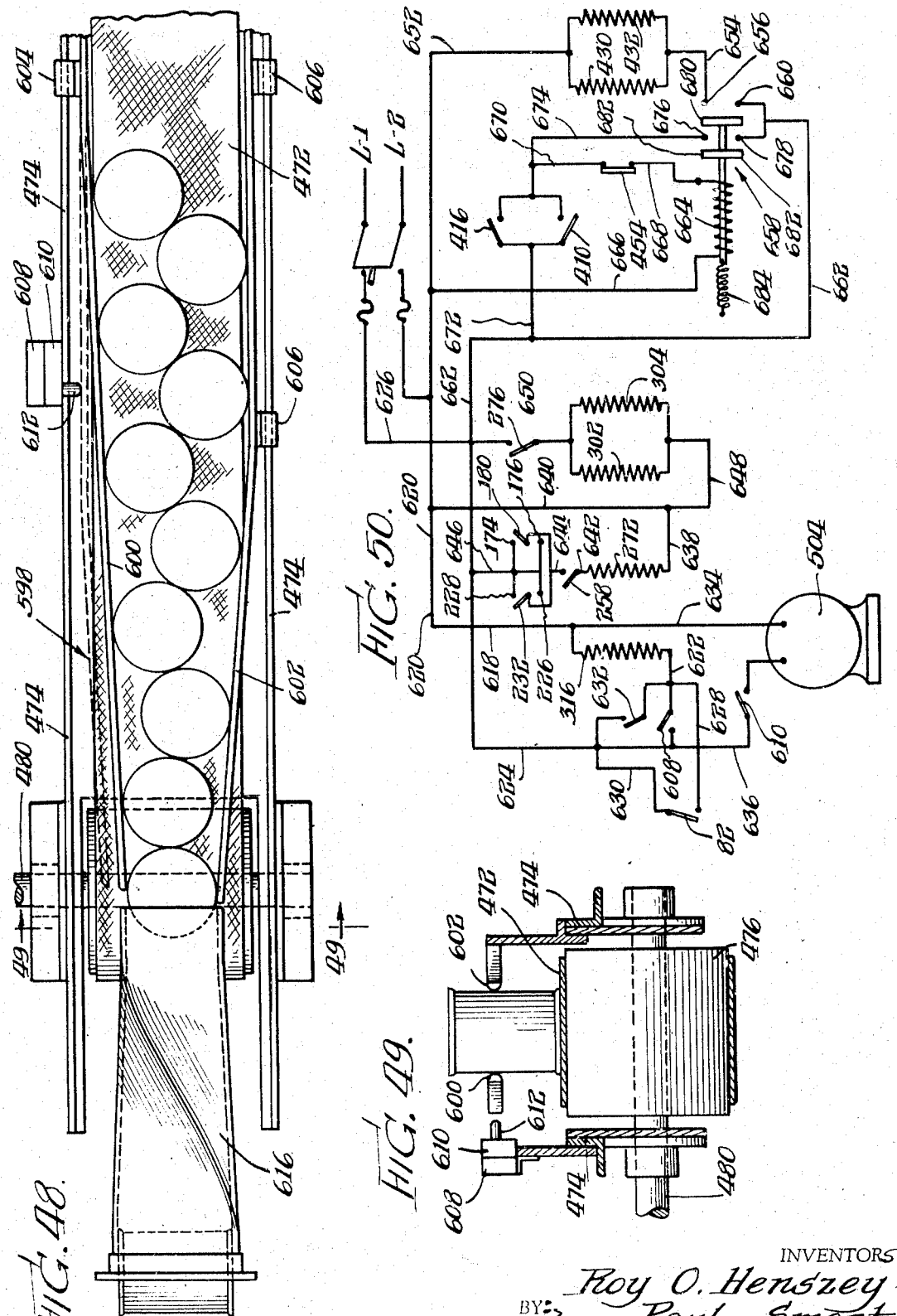

Patented Jan. 18, 1944

2,339,638

UNITED STATES PATENT OFFICE 2,339,638

METHOD AND APPARATUS FOR DETECTING DEFECTS IN FILLED CANS

Roy O. Henszey and Paul Smart, Oconomowoc, Wis., assignors to Carnation Company, Oconomowoc, Wis., a corporation of Delaware Application May 27, 1939, Serial No. 276,050

45 Claims. (Cl. 209—75)

The present invention relates to a method and apparatus for detecting defects in filled cans, and particularly for detecting defects in cans filled with liquid.

An object of the invention is to provide a method and apparatus for detecting mashed cans or cans which are longer than normal; for detecting bloated cans or cans having an abnormal internal pressure as evidenced by an inwardly or outwardly bowed end; for detecting cans in which the viscosity of the contents is greater or less than normal; for detecting filled cans which are below normal weight; and for accomplishing these testing functions in a given sequence to insure the maximum efficiency in the performance of each function.

Another object of the invention is to provide testing means for detecting mashed cans or cans which are of greater length than normal by a simple and efficiently operating mechanism, and to provide, in co-operation with such means, means for feeding cans thereto in a predetermined position while preventing the feeding thereto of cans not so positioned.

A further object of the invention is to provide a method or means for detecting filled cans in which the internal pressure is above or below normal, in which the apparatus is simple and inexpensive in construction, efficient in operation, and wherein there is provided means for sorting cans according to the contour thereof, preferably according to the contour of an end or ends thereof.

Applicants' invention further contemplates the provision of a method and apparatus for measuring the viscosity of the contents of a filled can and for rejecting cans in which the contents is above or below the normal viscosity.

A further object of the invention is to provide a method and apparatus for testing the weight of filled cans and for rejecting such filled cans which differ in weight from the normal weight.

A still further object of the invention is to provide means operated by an accumulation of cans in the machine for rendering the machine, or selected parts of the machine which might be damaged as a result of the accumulation, inoperative, and an ancillary object of the invention is to provide means for rendering the machine operative or inoperative in accordance with the feeding or non-feeding of cans to be tested through the machine.

A more specific object of the invention is to provide a machine for testing filled cans wherein there is provided can directing or feeding means automatically operable to render the machine operative or inoperative in accordance with the presence or absence of cans in the machine.

Other and further objects and advantages of the invention will be apparent from the following description when taken in connection with the accompanying drawings wherein Fig. 1 is a view in elevation of a machine embodying the invention;

Fig. 2 is a fragmentary plan view of the machine shown in Fig. 1;

Fig. 3 is a view in elevation of a portion of the machine shown in Fig. 1;

Fig. 4 is a section taken substantially along the line 4—4 of Fig. 3;

Fig. 5 is a view in perspective of a part of the can feeding track including a portion for controlling the operation of the machine;

Fig. 6 is a view in perspective of the machine controlling portion of the track;

Fig. 7 is a fragmentary view in elevation of the track portion shown in Fig. 5;

Figs. 8 and 9 are views in section taken along the line 8—8 of Fig. 7 for illustrating certain features of the operation of the mechanism shown in Fig. 7;

Fig. 10 is a longitudinal section taken substantially along the line 10—10 of Fig. 4;

Fig. 11 is a fragmentary substantially vertical section taken along the line 11—11 of Fig. 10;

Fig. 12 is a fragmentary substantially vertical section taken along the line 12—12 of Fig. 3;

Fig. 13 is a fragmentary longitudinal section taken along the line 13—13 of Fig. 4;

Fig. 14 is an exploded view in perspective of the contour testing instrumentality;

Fig. 15 is an enlarged view in perspective of a can guiding means forming part of the mechanism shown in Fig. 13;

Fig. 16 is a fragmentary substantially vertical section taken along the line 16—16 of Fig. 3;

Fig. 17 is a fragmentary view in perspective of a portion of the mechanism shown in Fig. 16;

Fig. 18 is a fragmentary substantially vertical section taken along the line 18—18 of Fig. 19;

Figure 42:
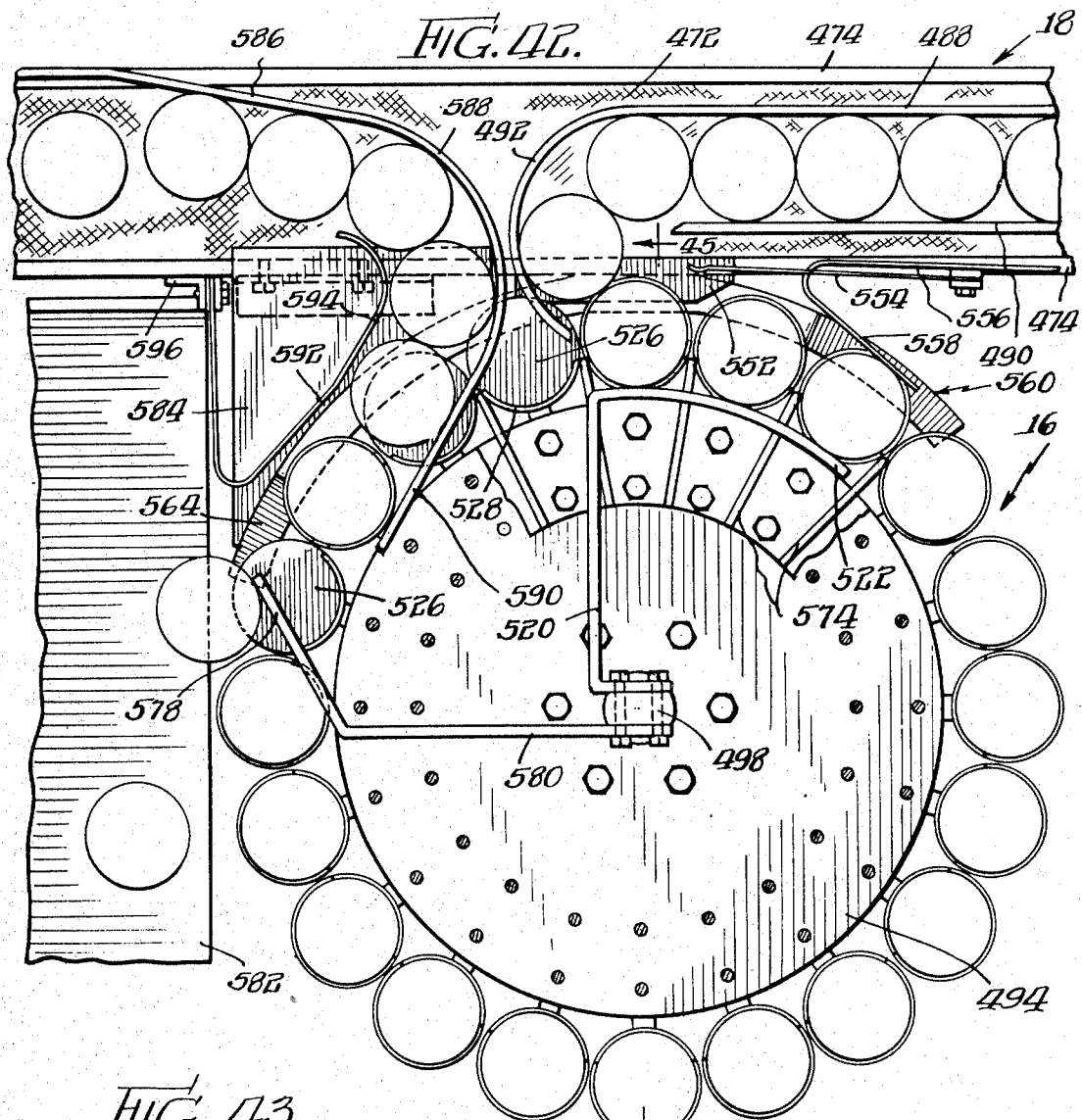
Figure 43:
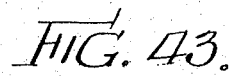
Figure 44:
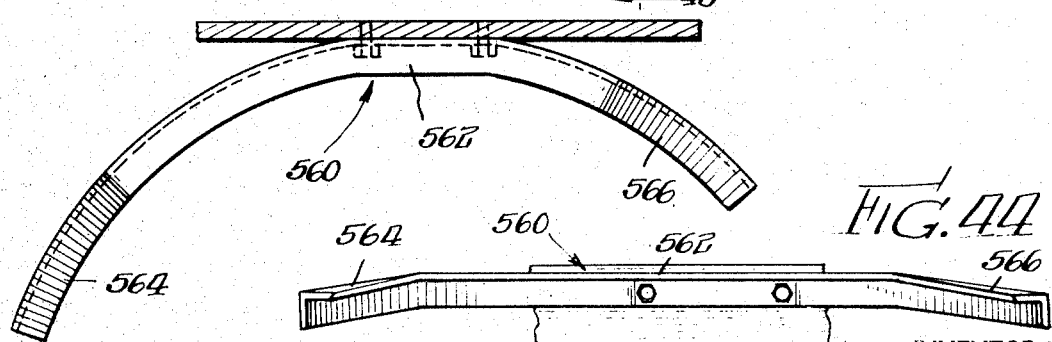

Figs. 25 and 26 are sections taken along the lines 25—25 and 26—26 of Fig. 27, illustrating the operation of the contour measuring means;

Fig. 27 is an enlarged substantially vertical section taken along the line 27—27 of Fig. 13 with certain parts omitted for purposes of clarity in illustration;

Figs. 28 and 29 are views of a portion of Fig. 27 but with the parts in different positions of operation;

Fig. 30 is a fragmentary view in elevation of the can directing and rejecting means controlled by the contour measuring mechanism of Figs. 13 to 29;

Fig. 31 is a view in substantially vertical section taken along the line 31—31 of Fig. 30;

Fig. 32 is a view in longitudinal section through the viscosity tester, taken substantially along the line 32—32 of Fig. 4;

Fig. 33 is a view in section taken along the line 33—33 of Fig. 32;

Fig. 34 is a view in section taken along the line 34—34 of Fig. 32;

Figs. 35 and 36 are fragmentary views in elevation and partly in section illustrating the operation of certain switches in accordance with the viscosity of the can contents;

Fig. 37 is a fragmentary view in perspective and partly in section showing the manner in which one of these switches is mounted for operation by the can;

Fig. 38 is a fragmentary view in elevation showing a can feeding and rejecting means controlled by the viscosity tester shown in Figs. 32 to 37;

Fig. 39 is a section taken along the line 39—39 of Fig. 38;

Fig. 40 is an exploded view in perspective of a can operated switch and its mounting means, forming also a part of the controlling means for the can directing and rejecting means of Figs. 38 and 39;

Fig. 41 is a fragmentary view in section taken along the line 41—41 of Fig. 32;

Fig. 42 is a plan view of the weight tester and inspection table, as well as the means for feeding the cans to and from the tester from the inspection table;

Fig. 43 is a plan section of a supporting track forming part of the weight tester;

Fig. 44 is a view in perspective of the track shown in Fig. 43;

Fig. 45 is a vertical section taken substantially along the line 45—45 of Fig. 42;

Fig. 46 is a fragmentary vertical section taken along the line 46—46 of Fig. 45;

Fig. 47 is a fragmentary vertical section taken along the line 47—47 of Fig. 45;

Fig. 48 is a plan view of the inspection table forming part of the present invention;

Fig. 49 is a fragmentary vertical section taken along the line 49—49 of Fig. 48; and Fig. 50 is a schematic diagram of the electric circuit for the machine shown in Figs. 1 to 49.

As shown in the drawings, a machine for testing filled cans in accordance with the invention embodies a can receiving and conveying means 2, mechanism 4 for controlling the machine, or certain parts thereof, in accordance with the presence or absence of cans to be tested, size testing mechanism 6, pressure testing mechanism 8, can directing or rejecting means 10 controlled by the pressure testing mechanism 8, viscosity or fluid friction testing mechanism 12, can directing or rejecting mechanism 14 controlled by the viscosity or fluid friction testing mechanism 12, weight testing mechanism 16, including means for rejecting filled cans of improper weight, an inspection table 18, including means for controlling the machine, or certain parts thereof, in response to the accumulation of cans on the inspection table, can feeding and discharge mechanism 20 which may, if desired, be used to convey the filled cans meeting the various tests to label-applying and packaging machines. Each of the can directing or rejecting means, when operated to direct or reject an abnormal can, of course, indicates the presence of such abnormal can.

The various testing mechanisms are preferably arranged in the order or sequence shown in Fig. 1 for a number of reasons, chiefly as follows: The size testing mechanism 6, which eliminates mashed cans or cans which are longer than normal, is preferably placed first because no type of defect which would be discovered by the subsequent testing mechanisms would interfere with the proper operation of this size testing mechanism, and because long or mashed cans would jam or impair the accuracy of the pressure testing mechanism 8, the viscosity or fluid friction mechanism 12, and the weight testing mechanism 16. The cans are next tested by the pressure testing mechanism 8 to detect and control the rejection of bloated cans in which the pressure is above normal and also cans in which the pressure is below normal. This test preferably follows the elimination of long or mashed cans because the presence of such cans in the pressure testing mechanism would interfere with its operation or impair its accuracy, and finer work may be done if only cans of the proper length are fed to the station for the testing of the pressure thereof. It is necessary in order to obtain smooth operation of the pressure testing mechanism that it operate only when cans are available for testing, and since the structure of the size testing mechanism is such as to make it convenient and economical to associate the control mechanism 4 with the inlet to the size testing mechanism, the pressure testing mechanism preferably follows immediately after the size testing mechanism. The cans passing the size and pressure tests are then tested for viscosity, and this test preferably follows the other tests for the accuracy of the viscosity test is improved by eliminating prior thereto all oversize cans and cans of abnormal pressure, and also because long or mashed cans and bloated cans would tend to jam in the viscosity testing mechanism. It is also essential for the proper operation of the viscosity testing mechanism that the cans to be tested be delivered to the testing mechanism in spaced succession and since, as will later appear, the pressure testing mechanism discharges the tested cans in spaced succession, the viscosity testing mechanism conveniently follows this pressure testing mechanism.

Light weight testing mechanism preferably follows the other testing mechanisms because the prior elimination of cans which are defective as to size, and pressure makes it possible to utilize a more sensitive weight testing mechanism than could otherwise be satisfactorily employed and because it has been found most convenient and economical for the feeding and discharge of cans to use the weight testing mechanism by the inspection table.

The inspection table is preferably placed last because in this position it provides means for facilitating a checking of the operation of the machine and because the prior elimination of the cans which are abnormal in size, pressure, viscosity or weight renders any defects, such as dirty or rusty cans or cans defective in some other unusual way, more conspicuous.

*The can receiving and conveying means*

This can receiving and conveying means preferably comprises an elevator 22 receiving at its lower end a supply of filled cans 24 on an inclined table 26 from a filling or processing apparatus or from another testing machine, such as the pellet detecting machine shown in Henszey et al. Patent No. 2,112,621. The elevator 22 preferably comprises a track 28 and a continuous conveyor 30 passing about pulleys or sprockets 32 and 34, one of which may be used to drive the conveyor while the other is merely an idler. The elevator 22 discharges the cans at the top of the track 28 into gravity feed means 36, which may be of any conventional construction, for feeding the cans at the proper speed to the control mechanism 4, which renders the pressure testing mechanism 8 operative when cans are available for testing and renders it inoperative when cans are not available for testing, and which also rejects cans which are improperly positioned for feeding into the size testing mechanism.

*Control mechanism responsive to the presence or absence of cans to be tested*

This control mechanism 4, as best shown in Figs. 5 to 11, is preferably supported or carried by a pair of spaced upright frame members 38 welded or otherwise secured at their ends to the horizontally spaced inclined main frame members 40, the upright frame members 38 held in spaced relation by reinforcing angle members or bars 42. Inclined can supporting and guiding tracks 44 of substantially L-shape in cross section at their outer ends are fastened to the inner surfaces of the upright frame members 38, the upstanding flanges of these L-shaped track members being spaced apart a distance somewhat greater than the axial length of the usual cans so as to permit long, mashed or bloated cans to pass therealong with no jamming. The tracks 44 at their outer ends support a box-like frame 46 into which extends the lower end of the gravity feed means 36, and extending between the upper transverse portion of this frame 46 and the upper spacing bar 42 are a pair of spaced rails 48 spaced from the inwardly directed flanges of the tracks 44 a distance somewhat greater than the diameter of the cans 24, and acting to insure proper positioning and rolling of the cans along the tracks 44 and preventing the cans from jumping this track or the balanced track 50.

The balanced track 50 comprises a pair of spaced rails 52 having beveled edges 54 at one end and secured at their opposite ends to the spaced arms 56 of a mounting bracket 58 having an integral apertured boss 60 extending between the spaced arms 56 and secured to a shaft or rod 62 journaled at its opposite ends in the upright frame members 38 and held against axial movement by collars 64. The rails 52 are spaced apart, as shown in Fig. 8, a distance slightly less than the axial length of the can 24 between the top and bottom rims 66 and, as shown in Fig. 9, a distance greater than the diameter of the can and the diameter of the top and bottom rims 66 so that a can having its axis extending horizontally may roll along the rails 52, but an endwise can having its axis extending vertically will drop between the rails 52. Inclined angle bars 68 are secured at their upper ends to the uprights 38 or to the track members 44 and extend below the rails 52 to receive therefrom the endwise cans and direct the same to a point of discharge or a receptacle from which the cans may be taken and placed on the plate 26. The inwardly directed bottom flanges of the tracks 44 are cut away to receive the outer end portions of the rails 52 of the balanced track, these rails lying inwardly of the plane of the upstanding flanges of the tracks 44, with the upper edges of the rails lying in the plane and constituting extensions of the inwardly directed flanges of these tracks so that the cans will roll smoothly under the action of gravity from the tracks 44 onto and along the rails 52 to the size testing mechanism 6. The balanced track 50 includes means for urging the rails 52 in an upward direction, and this means comprises a coil spring 70 interposed between the lower surface of the bracket 58 and an adjustable nut 72 on a screw 74 secured to the lower spacing bar 42, as by the head of the screw and a locking nut 76. The screw 74 also provides adjustable stop means for engaging the bracket 58 to limit the downward deflection of the balanced track rails 52. The rails 52 of the balanced track 50 are pushed upward by the spring 70 and held downward by the weight of the cans. When the balanced track is about half full of cans it is pushed downward by the weight thereof to its normal position, in which position it acts through an adjustable screw 78 carried by a laterally projecting lug 80 on the bracket 58 to hold a circuit maker and breaker 82 of the microswitch type in open circuit position.

The microswitch 82 is moved by the resiliency of its contact and by an auxiliary spring into a circuit closing position when the balanced track under the action of the spring 70 moves upwardly, the track being less than half full of cans. The microswitch 82 controls, in a manner later to be described, the operation of the pressure testing mechanism 8 to render the same inoperative when there is an insufficient number of cans available to warrant testing thereof, and to render it operative when a sufficient number of cans are available for testing and are positioned on the balanced track 50.

*Size testing mechanism*

Mashed cans usually have some portion of one end bulged or bent outward, thus increasing the over-all can length. The size testing mechanism now to be described therefore provides means for detecting such mashed cans and rejecting same, as well as detecting and rejecting cans which in the process of manufacture may have exceeded the normal can length. Also, those bloated cans in which an end or ends are severely bulged outwardly may also be detected and rejected by the size testing mechanism.

This size testing mechanism preferably comprises a pair of axially spaced disks 84 having the hub portions 86 secured to a shaft 88 journaled in bearing blocks 90 secured to spaced upstanding brackets 92 welded, or otherwise fastened, at their lower ends to the longitudinal main frame members 40. Each disk 84 has an outwardly flaring annular portion 94 which extends inwardly from the periphery of the disk, and the remaining portion 96 of the inner surface of each disk constitutes a plane surface substantially parallel to the like plane surface of the other disk. The plane surfaces 96 of the disks are spaced apart sufficiently to permit a can of normal over-all length to pass therebetween, but cans which are of greater over-all length will be engaged by the annular outwardly flaring portions 94 of the disks and will be carried upwardly with the disks as they rotate about the axis of the shaft 88 and deposited on an inclined track 98 which is provided with can supporting bottom rails 100 which project into the space between the disks 84, and side rails 102 which retain the cans on the rails 100 after they have rolled out of the disks 84. The track 98 may be supported on the longitudinal main frame members 40 in any convenient and desired manner, as, for example, by the spaced upright frame members 104. If desired, the track 98 may be used to convey the cans abnormal in size to a suitable receptacle, or the track may itself be used as a temporary storage place. When so used, the track preferably extends throughout the length of the machine, as shown in Figs. 1 and 3, to provide a maximum of such space.

The rails 52 of the balanced track 50 extend into a space between the disks 84, with their upper edges lying above the parallel plane which passes through the axis of the shaft 88, and these rails 52 terminate at their inner beveled edges 54 within the plane surfaces 96 of the disks 84 and adjacent to the outer end of laterally spaced rails 106. The rails 106 extend forwardly in the same plane as the rails 52 and carry the cans of normal size from the size testing mechanism 6 to the pressure testing mechanism 8.

The rails 106 form parts of a can supporting and feed track which, between the size testing mechanism 6 and the pressure testing mechanism 8, is provided with side bars 108 for maintaining the cans in proper position on the rails 106. The side bars 108, as well as the rails 106, may be secured to the upstanding frame members 104 lying between the size testing mechanism and the pressure testing mechanism. The disks 84 of the size testing mechanism may be continuously driven by means of a V belt 110 and a pulley 112 secured to one end of the shaft 88.

*Pressure testing mechanism*

Filled cans in which the internal pressure is above normal are recognizable by the outwardly bloated end or ends of the can, and filled cans in which the internal pressure is below normal are recognizable by the inwardly bowed end or ends. Therefore, filled cans in which the contents is at an abnormal pressure may be detected by a testing of the contour of an end or ends of the can. Mashed cans also may have one or both of their ends bowed inwardly or outwardly, and, hence, such mashed cans as pass through the size testing mechanism 6 may be detected as well as the cans of abnormal pressure by means testing the contour of an end or ends of such cans.

The pressure testing mechanism 8 accordingly provides means for testing the end contour of the cans and means for controlling can directing or rejecting means 10, whereby to reject filled cans of abnormal internal pressure and cans defective in other particulars, as evidenced by their abnormal end contour.

The means for testing the contour of the end or ends of the can preferably comprises in the illustrative embodiment (Figs. 3 and 13 to 29) a "star" wheel 114 providing a plurality of angularly spaced pockets 116 for successively receiving the cans to be tested from the rails 106, and for conveying the cans in succession between spaced end contour measuring and controlling devices 118 and 120 and onto the can directing or rejecting means 10.

The wheel 114 preferably comprises a central hub portion 122, Fig. 16, and axially spaced, radially projecting arms 124 in which are provided the pockets 116, the pockets 116 being so formed as to provide a concave surface 126, Fig. 13, engaging a substantial portion of the periphery of the can, and an outer convex portion 128 merging with the concave portion whereby to facilitate the rolling of the cans into the pockets for testing thereof and out of the pockets after they have been tested. The "star" wheel is secured at its central hub portion 122 to a shaft 130 journaled in bearing blocks 132 carried by the spaced upstanding arms 134 of a bracket 136 secured at its lower end to the longitudinal main frame member or members 40. The shaft 130 is driven by the V belt 110 through the intermediacy of a pulley 138 and a clutch mechanism 140 subsequently to be described.

Cans are retained within the "star" wheel during their movement between the contour testing devices 118 and 120 by means of guide bars 142, Figs. 13 and 15, having semi-circular portions 144 overlying the path of movement of the cans between these testing devices, the guide bars 142 being secured at one end to a plate 146 extending laterally from an upright frame member 104. The guide bars 142 are secured intermediately by angle brackets 148 to spaced plates 150, the plates 150 being secured to the arms 134 and 136 of the bracket which supports the shaft 130, and being provided with openings through which said shaft passes, as seen in Fig. 16. A leaf spring 152, extending between and parallel to the guide bars 142, is secured to said bars as by the cross strap 154, Fig. 15, and extends in a position to overlie and frictionally contact a cam during the testing of its end contour so as to prevent the can from shifting in its pocket 116 during this testing operation.

The end contour testing device 118 preferably comprises a plurality of vertically spaced bars or straps 156, 158, 160, each clamped at one end to and between spaced plates 162 which may be secured to the side bars 108 or formed integrally therewith, the bars 156, 158, 160 being fastened to the plates 162 in any convenient manner, as, for example, by rivets, bolts or the like 164. The upper and lower bars 156 and 160 are joined by an electrically conducting strap 166 and electrically insulating straps 168 and 170. The plates 162 to which the bars 156 and 160 are fastened by the bolts 164 are preferably of electrical insulating material, although if they be of metal, the bars 156 and 160 and the bolts 164 may be insulated from such metal plates. Electric connection is made to the bars 156 and 160 through one of the bolts 164 associated therewith, and both bars are maintained at the same electrical tension by means of the electrically conducting, inter-connecting strap 166.

The strap 166 carries a generally U-shaped metallic frame 172, the cross piece of the frame carrying an adjustable electric contact 174 in alinement with a like adjustable electric contact 176 carried by the strap 166.

The bar 158 terminates at its free end inwardly of the straps 166, 168, 170, and carries at its outer end an L-shaped piece or portion 178 having a forwardly projecting arm 180 forming an electric contact extending between the contacts 174 and 176 and adapted, upon flexure of the bar 158 relative to the bars 156 and 160, to engage one or the other of these contacts 176 and 174. The bar 158 is secured similarly to the bars 156 and 160, as previously described, between the insulating plates 162 although, if these plates be of metal, the bar and its clamping bolt 164 may be insulated therefrom. The electrical connection is made to the bar 158 through its clamping bolt 164.

The bars 156, 158 and 160 are provided with similar can feelers 182, 184, 186, the feelers 182 and 186 being secured to the bars 156 and 160 between the insulating straps 168 and 170 and insulating pieces or blocks 188. The feeler 184 is secured at its opposite ends to the bar 158 by pairs of insulating blocks 190 and 192. Each of the feelers 182, 184 and 186 is provided with a can engaging cam surface 194 extending into the path of movement of an end edge of the can and at an angle to such path of movement so as to engage and be moved outwardly by the end of the can, as shown in Figs. 25 and 26, thereby flexing the bars 156, 158 and 160, the feelers 182, 184 and 186 projecting through openings 196, 198 and 200 in the adjacent plate 150. The bars 156, 158 and 160 are so spaced in relation to each other and in relation to a can in a pocket 116 of the "star" wheel 114 that the feelers 182 and 186 ride on the rim of the can, while the feeler 184 rides on some flat portion of the can near the center of the can end. The contacts 174 and 176 are so adjusted in relation to the contact 180 that there is no electrical contact on normal cans, but a can in which the end is bowed or outwardly bent beyond a limit of tolerance, which may be a few thousandths of an inch, will flex the bar 158 a greater or lesser amount relative to the bars 156 and 160, and contact 180 will thereupon engage either the contact 174 or the contact 176, depending upon whether the end of the can is bowed outwardly or inwardly.

The end contour testing device 120 for the other ends of the cans is similar in substantially all respects to the end contour testing device 118, and comprises resilient bars or straps 202, 204 and 206 each mounted at one end between a pair of insulating plates 208 by means of bolts 210 through which electrical connection may be made to one of the outer bars and to the central bar. The outer bars are joined at their free ends by a conducting strap 212 and electrically insulating straps 214 and 216. The bars are provided with can engaging feelers 218, 220 and 222, similar to the feelers 182, 184 and 186, and similarly mounted on their respective bars. The strap 212 carries a metal frame 224 similar to the frame 172 and provided with an adjustable contact 226 alined with an adjustable contact 228 carried by the strap 212. The bar 204 terminates inwardly of the strap 212 and carries an L-shaped piece or portion 230 providing a forwardly projecting electrical contact 232 extending between the contacts 226 and 228, and is similar in all respects to the contact 180. The feelers 218 and 222, like the feelers 182 and 186, ride on the rim of the can but at the opposite end thereof, while the feeler 220 carried by the central bar 204 rides near the can center on some flat portion of the can end. It will be noted that the central bar 158 of the end contour testing device 118 lies substantially centrally between the bars 156 and 160, while the central bar 204 of the contour testing device 120 lies nearer the lower bar 206 than the upper bar 202. The reason for this difference in spacing is that the two ends of a can are of different shape, and therefore it is necessary to so place the bars that their feelers 184 and 220 will at the same instant ride on flat portions of the can, which flat portions are differently located on the two ends.

Since the end rims of the cans are not rectangular but circular, and since the ends of the cans are not plane surfaces but comprise concentric, annular, relatively raised and recessed portions, means must be provided for energizing the contacts controlled by the feelers for only a short time and preferably while the outer feelers of each set engage the rim of the can at opposite ends of a diameter thereof and when the central feeler of each set engages some flat portion of a normal can end. This is accomplished by a timing and control device or means 234, Figs. 16 to 24, which comprises a drum-like member 236 keyed to one end of the shaft 130, provided in its rim 238 with a plurality of pairs of radially alined openings 240 and 242 slidably receiving radially shiftable pins 244. All of the pins 244 lie in the same plane perpendicular to the axis of the shaft 130. The pins of one pair are connected by a co-planar extension 246, which may integrally join the two pins in this pair. The other two pairs of pins are connected together by right and left generally U-shaped yoke members 248 encompassing the connection extension 246 for the first pair of pins. Each pair of pins is adapted to assume three positions: first, a neutral position in which both pins of the pair project equally beyond the periphery of the rim 238 of the drum; second, a first active position in which one pin of the pair lies flush with the periphery of the rim 238 while the other pin of the pair projects a greater than normal distance beyond the periphery of the drum; and, third, a second active position in which the end of the last mentioned pin of the pair lies substantially flush with the rim 238 while the other pin projects beyond the rim a greater than normal distance. Means are provided for retaining each pair of pins in each of these three positions.

This means comprises a spring urged ball or roller 250 mounted with its spring 252 in an axially extending opening in the rim 238 and adapted to engage in any one of the three spaced annular grooves 254 for one pin 244 of each pair of pins. The spring and ball are retained in their opening by a cover plate 256 fastened to the inner face of the drum. The pins 244 successively actuate a microswitch 258 through a lever 260 and an adjustable set screw 262 carried at the free end of the lever and adapted, upon operation of the lever 260, to engage and press the switch operating leaf spring 264. The lever 260 is pivoted to a pin or stud 266 carried by a mounting plate or bracket 268, and the lever carries intermediate its ends a cam lug 270 adapted upon rotation of the drum 236 to be engaged successively by the pins 244, thereby depressing the switch operating lever to actuate the switch 258 to a circuit closing position. The drum 236 is positioned on the shaft 130 in such angular relation to the "star" wheel 114 that a pin 244 will engage and operate the switch lever 260 at a predetermined instant when a can in one of the pockets 116 of the "star" wheel is engaged by the outer feelers of the end contour testing devices 118 and 120 on opposite ends of a diameter of the can and when the central feeler of each device is, in the case of a normal can, engaged with the flat portion of the end surface of the can. The switch 258 at this instant completes a circuit through the central bars of the devices 118 and 120 from the contacts 180 and 232 (or from the sets of contacts 174—176 and 226—228) to a pin actuating and controlling solenoid or means 272, the actuated core of which is provided with an enlarged head portion or member 274 normally underlying the path of movement of the pins 244 but adapted, upon actuation thereof, to engage and move an alined pair of pins thereabove radially with respect to the drum to project the upper pin of the pair a greater than normal distance beyond the periphery of the rim 238. Therefore, if either set of feelers due to a can abnormality establish contact between the piece 178 or the piece 230 and one of their co-operating contacts when the switch 258 is closed, a circuit, subsequently to be described, will be closed to energize the solenoid 272 which in turn, and as above described, drives upward one of the pins 244 in the pinwheel or drum 236. This actuating pin is retained in its active position by the engagement of the spring pressed ball with the innermost groove in the pin.

Figure 19:
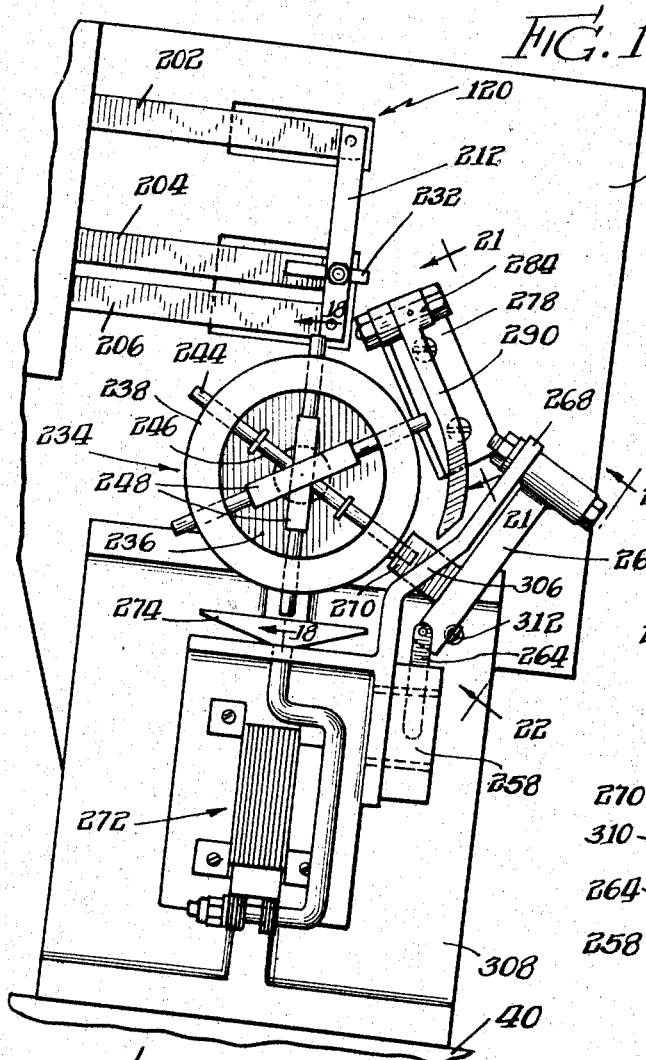
Fig. 19 is a fragmentary view in elevation taken from the lefthand side of the mechanism shown in Fig. 16.
Figure 21:
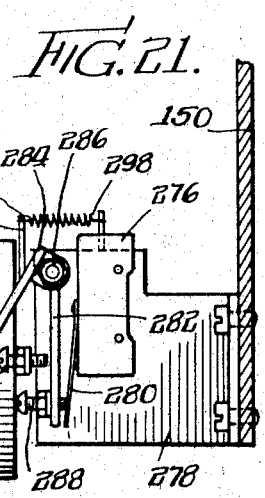
Fig. 21 is a view in section taken along the line 21—21 of Fig. 19.
Figure 22:
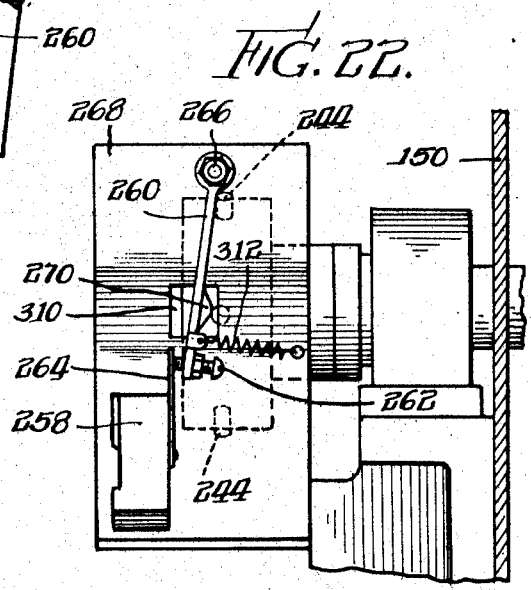
Fig. 22 is a view in section taken along the line 22—22 of Fig. 19.
Figure 20:
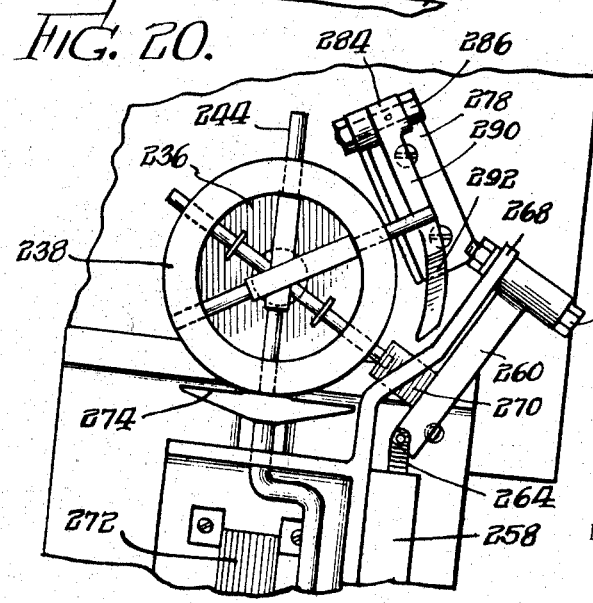
Fig. 20 is a view in elevation of a portion of the mechanism shown in Fig. 19 showing certain elements thereof in a different position of operation.
Figures 23, 24:
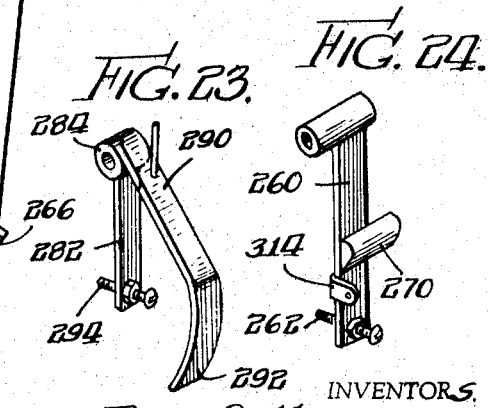
Figs. 23 and 24 are views in perspective of certain switch operating members forming parts of the mechanism shown in Figs. 13 to 22.

This actuated pin forms part of a means for controlling the can directing or rejecting means 10 to effect the rejection of a can having an abnormal internal pressure, as evidenced by a can having an abnormal end contour, and also to effect the rejection of cans which are defective for other reasons, and which such defects are evidenced by the abnormality of their end surfaces. This control means of which the actuated pin forms a part comprises a microswitch 276 mounted on a plate 278 bolted to one of the plates 150, the switch being provided with a resilient actuating strip or bar 280 adapted to be engaged by the arm 282 of a switch operating lever mechanism 284 pivoted on a stud 286 carried by the mounting plate 278. The arm 282 of the lever mechanism carries an adjustable set screw 288 for determining the amount of movement required of the lever mechanism to operate the switch 276. The other arm 290 of the lever mechanism 284 extends outwardly from the pivot stud 286 into the path of movement of an outwardly pre-set pin 244, as shown in Figs. 20 and 21, and this arm is further provided with an outer end portion 292 lying substantially in the plane of the pins 244 but formed as an arcuate portion concentric to the axis of the pinwheel or drum 236 and extending to a point, as shown in Fig. 19, closely adjacent the cam block or lug 270 carried by the switch arm 260. The outer movement of the lever mechanism 284 is limited by an adjustable stop 294 positioned to engage the lever arm 282, and is held in this position by a spring 296 extending between a first lug 298 of the mounting plate 278 and a lug 300 carried by lever arm 290.

The microswitch 276 controls the operation of gate actuating solenoids 302 and 304, Fig. 31, which form part of the can directing or rejecting means 10.

The actuated pins are returned to normal or neutral position by a cam 306 formed as an integral part of the mounting bracket 268, which bracket is mounted on a mounting bracket 308 for the solenoid 272. The bracket 308 is in turn mounted upon the supporting bracket for the shaft 130, as best shown in Fig. 16. The bracket 268 is provided with an opening 310 through which the cam lug 270 projects, and an edge of this opening limits the outward movement of the lever arm 260 under the action of a spring 312 secured between a pin carried by the bracket 268 and a lug 314 formed on the lever arm 260.

It is apparent from the foregoing description that as the pinwheel or drum 236 revolves, the pins successively actuate the switch 258 to energize the switches of the end contour testing devices 118 and 120. If, at this energized instant, the feelers of these devices engage a can end of abnormal contour, the central feelers of these testing devices 118 and 120 will be flexed relative to the outer sets of feelers, as shown in Figs. 28 and 29, to complete a circuit, as previously described, to the solenoid 272 which also, as previously described, pre-sets one of the pins to a position projecting a greater than normal distance beyond the periphery of the drum 236. This pre-set pin moves, as will be evident, in exact synchronism with the tested can, and as the pinwheel or drum revolves it engages the lever mechanism 284 to actuate the switch 276 to control the actuating solenoids 302 and 304 and the can rejecting or directing means 10. As the pre-set pin passes beyond the switch operating lever mechanism 284 it is engaged by the cam surface 306, to be thereby returned to neutral position with respect to the wheel or drum 236, and it simultaneously engages the cam lug 270 to energize the contacts of the end contour testing devices 118 and 120, there being at this instant a can properly positioned between these testing devices.

As previously indicated, the operation of the pressure testing mechanism 8 is controlled by the control mechanism 4 to be rendered inoperative if no cans are available for testing, and to be rendered operative only when cans are available for testing. For this purpose the clutch mechanism 140, which operates to connect the driving pulley 138 to the shaft 130, is controlled by solenoid 316 energized by the switch 82, through a circuit subsequently to be described, the switch 82 being actuated, as previously described, by the balanced track 50.

The clutch mechanism 140 comprises a disk or plate 318 provided with a friction ring or annulus 20 adapted to engage a face of the pulley 138, the plate 318 being carried by a grooved collar 322 splined on the shaft 130 for rotation therewith and for axial movement relative thereto to withdraw the friction ring 320 from contact with the pulley 138. The friction ring 320 is normally held in contact with the pulley by a coil spring 324 embracing the shaft 130 and interposed between the grooved collar 322 and a collar or abutment 326. The solenoid 316 actuates the collar 322 axially of the shaft against the force of the spring 324 to release the clutch mechanism through a lever 328 connected with the armature of the solenoid by a link 330, the lever 328 being provided at its upper end with a substantially U-shaped yoke 332 having inwardly projecting pins 334 engaging in the groove 336 in the collar 322. The lever 328 is pivoted at its upper end by means of a pin or pins 338 passing through openings in the arms in the U-shaped yoke 332 and carried by a mounting plate or plates 340 secured to one of the plates 150, Fig. 16. Means are provided for stopping the clutch plate 318 and the shaft 130 when the clutch is operated by solenoid 316, and this means or brake comprises a plunger 342 slidably and adjustably mounted in a housing 344 carried at the upper end of one of the arms of the U-shaped yoke 332. The plunger 342 is resiliently urged into braking position by an embracing coil spring 346 interposed between the head of the plunger and the bottom of a receiving opening in the housing 344. It will be evident that when the solenoid 316 is energized, the clutch operating lever 328 will be moved in a clockwise direction, as seen in Fig. 16, about its pivot stud 338, thereby to move the clutch collar 322 axially of the shaft 130 away from the pulley 138, this collar in turn moving the clutch ring 320 out of engagement with the pulley and the clutch collar carrying the plate 318 into braking engagement with the braking plunger 342 which thereby brings the clutch plate and the shaft 130 quickly to rest.

The can directing or rejecting means 10 comprises a track 348 along which normal cans are directed to the viscosity or fluid friction testing mechanism 12, a track or channel 350 along which cans of abnormal contour are directed to a point of discharge or a suitable receptacle, and a pair of gates or control members 352 and 354 controlled by the solenoids 302 and 304 for selectively directing the cans to the tracks 348 and 350. Cans are delivered to the gates 352 and 354 from the "star" wheel 114 by means of a sharply inclined track 356, Fig. 13, on which the cans are moved by the "star" wheel as it rotates, the track 356 being carried by one or both of the plates 150 of the pressure testing mechanism.

The gates 352 and 354 may comprise angle bars, each secured to the outer ends of the arms 358 of a bell crank, the other arm 360 of which is connected to the core of the actuating solenoids 302 and 304 by means of a link 362. The bell cranks 358 are pivoted by shafts 364 to brackets 366 carried by spaced supporting plates 368 also forming guide rails limiting the sidewise movement of the cans. The supporting and guiding plates 368 are fastened to an angle bar 370, in turn secured to the rails 102 of the inclined track 98. When the switch 276, Fig. 21, is actuated by the lever mechanism 284 in response to the presence of a defective can at the point of discharge of the pressure testing mechanism, the solenoids 302 and 304 are simultaneously energized to move the gates 352 and 354 outwardly to uncover the reject channel or track 350, the switch 276 being held closed by a pin 244 acting through the lever mechanism 284 until the defective can has rolled down the track 356 and into the reject channel 350. The actuating pin 244 then releases the lever mechanism 284 and the switch 276, the solenoids 302 and 304 are de-energized and the gates 352 and 354 returned to normal closed position by the weight of the cores of the solenoids or by auxiliary springs, if desired. A can of normal end contour will not cause actuation of the switch 276 and, hence, such can, when discharged from the "star" wheel 114 will roll along the track 356 onto the gate bars 352 and 354 and across to the track 348 by which such cans are fed to the viscosity or fluid friction testing mechanism 12.

*Viscosity or fluid friction testing mechanism*

Viscosity is defined as fluid friction. Therefore, the measure of the friction between the fluid and the internal surface of the vessel or can in which it is contained is a measure of the viscosity of the fluid. If a fluid filled can is given a spin at a definite rate for a definite period, some energy of the rotation will be absorbed in the rotation of the fluid contents. All other conditions being equal, this energy of rotation will be greater the more viscous the fluid. Also, if a fluid filled can is rolled down an incline, its velocity will be a function of its initial kinetic energy of rotation and translation, its path, and the friction between the track provided and the can and the viscosity or fluid friction of the fluid contents. The speed of an object projected at a fixed vertical angle determines its elevation at any given point in the trajectory of the projected object. Applicants' viscosity testing mechanism utilizes these principles to effect a measurement of the viscosity of the contents of a fluid filled can and to control the rejection of cans of abnormal viscosity.

This viscosity testing mechanism comprises a relatively large drum 372 around which passes a plurality of spaced V belts 374 projecting beyond the periphery of the drum 372, and these V belts are driven by a relatively small drum 376, Fig. 3, carried by the shaft of the motor 378 mounted on the underside of the longitudinal main frame member 40. The large drum 372 is mounted on and secured to a shaft 380 journaled in bearing blocks 381 mounted on the sides of the longitudinal main frame member 40. The shaft 380 also carries a pulley 382 which drives the V belt 110, which latter, as previously described, drives the size testing mechanism 6 and the pressure testing mechanism 8.

Overlying a portion of the drum and spaced radially from the periphery thereof is a curved rail 384 concentric with the axis of the drum 372, the rail 384 being mounted by brackets 386 on uprights 104. The rail 384, Figs. 32 and 34, is provided on its inner face with spaced yieldable guides 388 of a material such as sponge rubber. The V belts 374 receive cans to be tested from the track 348, Fig. 3. The drum 372 rotates in a clockwise direction, Figs. 3 and 32, at a steady continuous speed, and the clearance between the sponge rubber guides 388 and the V belts is less than a can diameter so that the can is held tightly by these guides and belts and thus forced to roll along the guides 388.

Side guides adapted to engage the end rims of the cans to prevent endwise shifting of the cans comprise spaced bars 390, Figs. 32, 34, and 41, extending between the planes of the guides 388 and the V belts 374. The bars 390 are slotted longitudinally of their inner faces, and mounted in the slots are anti-friction polished stellite rods 392 engaging the rims of the cans, thus preventing endwise shifting of the cans without exerting any appreciable retarding effect on the rotation or rolling of the cans along the guides 388. From the downwardly curved V belts cans pass onto a pair of laterally spaced, concave rails 394 secured to the arms of the main frame member 40 as by bolts or shafts 396, and spacer sleeves or blocks 398. It will be noted that the V belts 374 are so spaced as to engage the wall of the can, while the bars 394 are spaced to engage and support the rims of the cans so that the cans roll on their rims along these bars, and at the same time the V belts 374 may pass downwardly to the driving drum 376 in the space between these bars 394. The bars 394 form the rails of a gravity track section of which the extensions of the bars 390 form fixed side guides, and this track section is not provided with a top guide. The side guides 390 are preferably made of stellite, further to minimize the effect of external can friction, thus making the fluid friction or viscosity of the fluid contents larger in effect. The entrance end of the gravity track section is provided with anti-slip devices, such as strips 400, Figs. 32, 33, and 41, to increase the contact friction of the can with the bottom rail as the cans enter this gravity track section. It will be seen that cans entering the track section 402, represented by the V belts 374, the top guides 388, and the side guides 390, will be caused to rotate or roll along the guides 388 in a counterclockwise direction, as seen in Fig. 32, thus also imparting to the fluid contents of the can a rotation in the same, or counterclockwise, direction. As the filled cans enter the gravity track section 404, represented by the bottom rails 394 and the side rails 390, the cans tend to reverse their direction of rotation and to rotate in a clockwise direction, as represented by the solid line arrow in Fig. 32, but the fluid contents of the cans are still rotating in a counterclockwise direction, as shown by the dotted line arrow, and this reverse energy of rotation of the fluid contents continues to oppose the energy of forward motion of the can as it rolls down the gravity track section. The forward end of the gravity track section is inclined upwardly to project the filled cans between a pair of can operated switch control members 406 and 408 and into the can directing or rejecting means 14 which is controlled by the switches operated by members 406 and 408.

The switch control member 408 preferably comprises a resilient strip overlying the switch operating member or plunger of a switch 410 carried by a lever arm 412 fastened to a shaft 414 extending between laterally spaced upright frame members 104. The switch operating member 408 is alined substantially midway between the bottom rails 394 of the gravity track section 404, and the switch operating member 406 is placed in the same vertical plane with the switch operating member 408. The switch operating member 406 is mounted similarly to the switch operating member 408 to control a switch 416 upon a similar lever 418 in turn fastened to a shaft 420 journaled in the spaced frame members 104. Each of the shafts 414 and 420 is adjustably controlled by a set screw 422 carried by a lever arm 424 secured to one end of the shaft and adapted to engage a fixed block 426 carried by the longitudinal main frame member 40 or an upright frame member 104. A spring 428 secured at one end to the block 426 and at its other end to the lever arm 424 for the shaft 420, retains the shaft in adjusted position. A similar spring may be used, if desired, to retain the bottom shaft 414 in adjusted position, although, as shown, the weight of the arms 412 and 424 and the switch member 410 normally acts to retain the shaft 414 in its adjusted position. If the contents of the can is of abnormally high viscosity, its speed and its angle of projection from the gravity track section will be low and, hence, it will operate the lower switch member 408. If the viscosity of the contents of the can is abnormally low, its speed and its trajectory will be high and it will operate the switch member 406. When the contents of the can is of normal viscosity, the can passes between the switch members 406 and 408 without operating either of these members.

The switches 410 and 416 control, through circuits subsequently to be described, solenoids 430 and 432 of the can directing or rejecting means 14, Figs. 38 and 39.

The can directing or rejecting means 14 is similar in construction to the can directing or rejecting means 10, and comprises a pair of gate bars 434 and 436 mounted on the lower free ends of arms 438 of a pair of bell cranks, the other arms 440 of which are connected to the cores of the solenoids 430 and 432 by links 442. The bell cranks are mounted by shafts 444 on brackets 446 secured to spaced plates 448, these plates being spaced apart sufficiently to permit the cans to roll therebetween along the gate bars 434 and 436 when these bars are in normal position extending inwardly of the planes of these plates. The plates 448 are secured to the longitudinally extending bars 102 of the storage track 98 in the same manner as the plates 368 of the can directing or rejecting means 102 are secured to said bars 102, see Fig. 31.

The gate bars 434 and 436, when in normal position, allow the cans to roll onto a track 450, Figs. 1 and 32, by which the cans are fed to the inspection table 18. When the gate bars 434 and 436 are swung outwardly, they permit the cans to fall into a discharge chute, way, track, or channel 452 by which the defective cans are conveyed to a suitable point of discharge or container.

Since the solenoids 430 and 432 are energized in response to the instantaneous contact of a can with either of the switch members 406 or 408, means must be provided for maintaining the solenoids energized for a sufficient length of time to permit the can which actuated either of the switch members to pass through the gate bars and into the rejecting channel 452. This is accomplished, according to one embodiment of the invention, by interposing a self-locking relay, subsequently to be described, in the electrical circuit between the switches 410 and 416 and the solenoids 430 and 432 controlled thereby, and an auxiliary switch 454, Figs. 38 and 39, actuated by a defective cam passing between the gate bars 434 and 436 to break the locking circuit of the self-locking relay. This auxiliary switch 454 may be mounted by a bracket 456 on an arm of the longitudinal frame member 40, and the actuating plunger of the switch is actuated by a leaf spring 458, in turn actuated by one of the spaced arms 460 of a lever mechanism. The lever mechanism may be pivotally mounted as at 462 on a plate 464 carried by one of the supporting plates 448. The arms 460 are substantially L-shaped and carry at their outer free end portions a downwardly and outwardly directed plate 466 adapted to extend into the path of movement of a can passing between the gate bars 434 and 436 and into the rejecting channel 452.

The lugs 468 and 470 projecting from the mounting plate 464 limit the movement of the lever mechanism.

The weight testing mechanism and the inspection table

Normal cans are fed from the viscosity testing mechanism 12 to the inspection table 18 along the track section 450, which is provided with a twisted section of common construction for turning the rolling cans into a vertical position and depositing them in such vertical position onto the surface of the inspection table.

The inspection table 18 comprises a continuous belt 472 passing between spaced side rails 474, Fig. 42. The belt 472 at one end of the table passes over an idler pulley or drum 476, Fig. 1, and at the other end of the table passes over a driving pulley or drum 478 secured to a shaft 480. The shaft 480 carries a driving pulley 482 driven by a belt 484, in turn driven by a pulley 486 secured to the shaft 380 of the large drum 372, which drum, as previously described, is secured to said shaft and driven by the motor 378 through the V belts 374.

The weight testing mechanism 16 receives cans from the inspection table 18 and, after testing thereof, returns cans of normal weight to the inspection table. For this purpose the inspection table 18 is provided with a pair of laterally spaced, longitudinally extending guide bars 488 and 490, Fig. 42, between which is received the cans from the track section 450. The guide bar 488 is provided with a curved end section 492 for directing the cans laterally of the conveyor belt 472 during the forward movement of the belt, the cans being thereby directed into the weight testing mechanism 16. The guide bar 490, of course, terminates short of the arcuate section 492 of the other guide bar so as to permit the cans to move across the conveyor belt.

The weight testing mechanism 16 comprises a continuously rotating turret or table, including a relatively large disk 494 secured to a sleeve 496 (Fig. 45) embracing a portion of the stationary shaft 498 to which the sleeve is journaled by its reduced bearing portion 500 and the antifriction bearing 502. The sleeve 496 is driven by an electric motor 504 through a worm gear 506 on the motor shaft and a worm wheel 508 secured, as by bolts 510, to the annular flange 512 of the sleeve 496. The gears are mounted in a lubricating housing 514 on the bottom wall of which the sleeve 496 is journaled, as by the bearing 516, and the housing may be mounted on the lower portion of the shaft 498 or through a suitable column to the base 518, Fig. 1, of the weight tester.

The stationary shaft 498 extends above the table 494 and carries at its opposite end a bar or arm 520 projecting radially above the table and provided with an arcuate outer end portion 522 concentric with the axes of the shaft 498 and sleeve 496 to engage the cans as they are delivered to the weighing mechanisms 524 of the tester mechanism to insure proper positioning of the cans on this weighing mechanism.

Each weighing mechanism 524 comprises a pan 526 having a semi-circular upwardly projecting flange 528 extending about the inner portion of the pan. The pan 526 is provided with depending lugs 530, to the inner surfaces of which are secured plates 532 having in their lower edges V-shaped recesses to receive the fulcruming rod 534 provided with a knife edge seated in the recesses of the plates 532. The fulcrum 534 is journaled in and carried by the arm 536 of a counterweight 538. The counterweight 538 is fulcrumed at a fixed point with reference to the table 494 by means of a fulcrum rod 540 having a knife edge received in V-shaped recesses of plates 542 secured to the inner faces of a yoke 544 bolted to and depending from the table 494.

Means are provided for preventing each pan from tilting during its weighing operation, and this means comprises a lever arm 546 fastened to one of the depending lugs 530 of the pan 526, as shown in Fig. 47. A similar arm 548 is secured to one of the arms of the yoke 544, and these arms 546 and 548 are interconnected by a link 550 pivotally fastened to the bottom end of each of the arms. The arms 546 and 548 are so proportioned that the link 550 maintains the lever 546 in a vertical position as the pan 526 is depressed under the weight of a filled can.

The outer rail 474 of the inspection table carries a plate 552 lying substantially in the plane of the belt 472 and extending into overlapping relation with the pans 526 adjacent the arcuate section 492 of the can guide bar 488, thereby positioning each can into the pan pocket formed by the semi-circular flange 528. As the table 494 rotates the can is moved by the flange 528 off the plate 552, which plate may have its upper face tapered vertically to facilitate the depositing of the can onto the base of the pan as it leaves the plate 552.

Means are provided for insuring the proper positioning of the cans in the pans and against the flange 528. This means comprises a pair of spring straps 554 and 556 secured to the outer rail 474 of the inspection table, the strap 554 projecting over the plate 552 in position to urge the cans moving over the plate outwardly thereof and into the pan. The spring 556 is provided with a reversely bent portion 558 and adapted to engage the cans after they have moved from the plate 552 to insure the positioning of cans in contact with the flange 528.

The pans 526 are held in their upper position to receive the cans from the plate 552 by a can guide bar 560, which comprises a central flat portion 562 (Figs. 43 and 44) along which the pans ride while under the plate 552, and oppositely inclined opposite end portions or cam surfaces 564 and 566, the cam surfaces 564 engaging the under-surface of the pans and moving them upwardly to the surface 562, while the cam surface 566 allows the pans to slowly descend during the rotation of the table and under the weight of the cans on the pans. An adjustable set screw 568 carried by an annular plate 570 supported on the sleeve 496 provides a stop for the counterweight 538 to prevent elevation of the pans above the can guide bar 560 in the interval between the discharge of the can from the pan and the placing of another can on the same pan. The pan 526 is always tilted or inclined to the horizontal to allow the table 494 to be rotated at a relatively rapid rate without, however, discharging a can from its weighing pan during the rotation of the table. The arcuate section 522 of the bar 520 co-operates with an arcuate bar 572 extending about a portion of the table 494 in close juxtaposition to the periphery thereof to prevent inward toppling of the cans as they move from the conveyor belt into the weighing pans.

Additional guiding and supporting means may also be provided to engage an intermediate portion of the wall of the can and prevent inward toppling of the can during the rotation of the table 494. This means may comprise a plurality of angularly spaced plates 574 secured to the table 494 and each provided with an outwardly extending face to engage an intermediate portion of the wall of the can in its associated pan. The plates 574 additionally serve to approximately center the cans in the pockets as they are fed onto the scale pans and to aid in forcing cans back onto the conveyor at the discharge point, thus making the feeding of the cans easier of accomplishment and protecting the scale parts from considerable strain and wear. An adjustable counterweight 576, Fig. 45, may be slidably mounted on each link 550 to provide precise means for adjustably predetermining the extent of depression of its associated pan 526 under a filled can of normal weight. Cans of lighter weight, therefore, will not be depressed this predetermined extent, and during rotation of the table such cans of lighter than normal weight will be engaged at their upper rim by the outwardly projecting cam portion 578 of a bar 580 secured to the upper end of the stationary shaft 498. The cam portion 578, in engaging the cans of lighter weight during the rotation of the table, deflects or moves the cans radially outwardly of the table and into or on a channel, track or conveyor 582, Fig. 42, by which these defective cans are conveyed to a point of discharge or suitable container. Cans which are of normal weight, in depressing the scale pans 526 the predetermined extent, will clear the bottom edge of the bar 580, and the pans which support these normal cans will be carried by the rotating table onto the cam surface 564 of the can guide bar 560, which bar, as previously described, will move the pans with cans thereon upwardly and onto the level of a transfer guide plate 584, Fig. 42, which may have its upper face inclined so that its outer edge lies below the surface of a pan supported by the guide bar 560, but its inner edge lies above or at the level of the conveyor belt 472.

A guide bar 586, secured to the inner rail of the inspection table, extends over the belt 472 and is provided with an intermediate arcuate section 588 and a straight section 590 extending over the table 494 at such an angle that the cans will be moved radially of the pans 526 out of the pocket formed by the semi-circular flange 528 of each pan. The arcuate section 588 reverses the direction of movement of the cans onto the conveyor belt 472. A guide bar 592 is provided with a reversely bent, resilient portion 594 to engage the cans and compel them to move along the surface of the arcuate section 588 of the bar 586. The bar 592, which may in its entirety comprise a resilient strip, may be mounted on the inner rail 474 of the inspection table, as by the bracket 596.

The inspection table 18 may extend any desired distance to accommodate any desired number of inspectors, whose duty it is to inspect the cans on the table and remove therefrom any cans having such unusual defects as would not be automatically detected by the machine.

It will be noted that cans are fed through the machine and into the weight testing mechanism in a single line of succession, whereas the inspection table beyond the weight testing mechanism is nearly wide enough to accommodate two can streams, thereby permitting a large number of cans to be handled per minute by the automatic testing and rejecting mechanisms while allowing more leisurely inspection of the cans by the inspectors.

Means 598 are provided as a part of the inspection table for effectively disabling the machine if the inspection table becomes filled, and specifically for stopping the weight testing mechanism 16 and the pressure testing mechanism 8. It will be evident that upon the stopping of the weight testing mechanism no additional cans will be fed to the inspection table beyond this mechanism, and that stoppage of the pressure testing mechanism will prevent the feeding of cans to the viscosity testing mechanism and to the inspection table in advance of the weight testing mechanism, although such cans as may be in the processes of passage from the pressure testing mechanism to the inspection table will be fed through in the usual manner. The jamming up of cans in the size testing mechanism 6 due to a stoppage of the pressure testing mechanism, will not, of course, damage the size testing mechanism, for the cans of normal length which are at the moment positioned between the plane surfaces 96 of the disks 84 (Figs. 10 and 12) will simply rest on the track rails 52 and 106 passing through these disks, and this line of cans will prevent the gravity feed of more cans to the disks 84.

This control means 598 may comprise, as shown in Figs. 48 and 49, a pair of half round bars forming side guides 600 and 602, the bar 600 of which may constitute an integral extension of the bar 586 secured to the inner bar 474 of the inspection table, as by bracket 604. The bar 600 at the outer end of the table extends over the belt 472 and co-operates with the outer end portion of the bar 602 to form a way or channel through which cans may pass only in a single stream. The bar 602 may be secured to the outer bar 474 of the inspection table, as by brackets 606. It will be noted by reference to Fig. 48 that a substantial length of the bar 600 is left unsecured to the rail 474. The bar 600 possesses sufficient resilience so that, being thus unsecured for a substantial portion of its length, it may be flexed outwardly from the solid line position to the dotted line position in Fig. 48, if the cans become jammed at the outlet of the inspection table. Upon outward movement of the end of the bar 600 the bar operates a pair of switches 608 and 610 interconnected for simultaneous operation by a switch operating member 612 positioned to contact the bar 600. The switches 608 and 610, through circuits presently to be described, control the driving motor 504 for the weight testing mechanism and the clutch mechanism 140 (Fig. 16) of the pressure testing mechanism to de-energize the motor 504 and to energize the actuating solenoid 316 of the clutch mechanism, thereby to disconnect the driving pulley 138 from the shaft 130 of this mechanism.

From the inspection table the tested cans pass to the can feeding and discharging mechanism 20, as shown in Fig. 1 but which may be of any convenient construction, such, for example, as an elevator 614 into which the cans are fed by a gravity track 616 having a twisted portion for turning the cans from an endwise position on the conveyor belt to a sidewise position for rolling along the inclined rail of the elevator 614.

The control circuit

In this control circuit, as shown in Fig. 50, the control solenoid 316 of the clutch mechanism 140 of the pressure testing mechanism 8 is connected by wires 618 and 620 to the power supply line L—2 through the usual fuse and switch and through the wires 622, 624 and 626 to the power supply line L—1. The switch 608, controlled by the side guide 600 of the inspection table 18, is connected in series with the solenoid 316 and controls the connection of the wire 622 to the wire 624. The switch 82, controlled by the balanced track 50, is connected in shunt to the switch 608 by means of the wires 628 and 630, and similarly controls the connection of the wire 622 to the wire 624. The manually operable switch 632 may also be connected in shunt to the switch 608 to connect the wire 622 to the wire 624, even though the switches 608 and 82 may be in open circuit position.

The motor 504 for driving the weight testing mechanism 16 may be connected to the supply line L—2 by the wire 634 and the wires 618 and 620, and it may be connected to the supply line L—1 by the wire 636 and the wires 624 and 626. The switch 610, which is actuated by the side guide 600 of the inspection table, is interposed in the wire 636 so as to break the circuit to the motor 504 when this switch is moved to open position.

The solenoid 272, which controls the setting of the pins 244 of the pressure testing mechanism 8, is connected on one side by the wires 638 and 640 and the wire 620 to the supply line L—2. At its other side or terminal the solenoid 272 is connected by the wire 642 to the switch 258, which intermittently connects the set of center feeler contacts 180 and 232, or the sets of outer feeler contacts 174 and 176, 226 and 228 to the solenoid 272. As shown in the circuit of Fig. 50, the switch 258 is connected by wire 644 to the center feeler contacts 180 and 232, while the outer feeler contacts 174 and 176, 226 and 228 are connected by a wire 646 and wires 624 and 626 to the supply line L—1. It will be evident from this description that if one or the other of the center feeler contacts 180 and 232 engage one of the set of four contacts 174 and 176, 226 and 228 at the instant that the switch 258 is closed, the circuit just described will be completed to energize the pin setting solenoid 272 of the pressure testing mechanism 8.

The solenoids 302 and 304, which control the gate bars 352 and 354 of the can directing or rejecting means 10, are connected in shunt to each other and by the wires 648 and 650 to the wires 620 and 626, which in turn are connected to the supply lines L—1 and L—2. The pin actuated switch 276 of the pressure testing mechanism 8 is interposed in the wire 650, and it will be evident that when this switch is closed by a pin 244 pre-set by the solenoid 272, the solenoids 302 and 304 will be energized to actuate the gate bars 352 and 354. As previously described, the switch 276 is retained in closed position for the required length of time to permit a defective can to pass into the rejecting track or channel 350 and is then automatically returned to open position.

The solenoids 430 and 432, which control the gate bars 434 and 436 of the can rejecting and directing means 14, are connected in shunt to each other and at one common end by a wire 652 to the supply line L—2. At the other common end the solenoids 430 and 432 are connected by a wire 654 to the fixed contact 656 of a self-locking relay 658. The companion fixed contact 660 of the self-locking relay 658 is connected by the wire 662 and the wire 626 to the supply line L—1.

The actuating solenoid 664 is connected at one end by a wire 666 and the wire 652 to the supply line L—2. The other end of the solenoid 664 is connected by the wire 668 to the can operated switch 454 of the can directing or rejecting means 14, which switch is normally closed, as shown in Fig. 50.

The can actuated switches 410 and 416 of the viscosity testing mechanism 12 are connected in shunt to each other and by a wire 670 to the normally closed switch 454, and also by the wire 672, the wire 662 and the wire 626 to the supply line L—1.

A locking circuit for the solenoid 664 of the self-locking relay 658 comprises the wire 668, the switch 454, the wire 670, and wires 674 and 662, which are respectively connected to the fixed contacts 676 and 678 of the relay 658. The relay 658 also includes the movable switch arms 680 and 682, which respectively control the connection of the contacts 656 and 676 to the line connected contacts 660 and 678, respectively.

From this description of the control circuit for the solenoids 430 and 432, it will be evident that upon closure of either of the switches 410 and 416 by a filled can of abnormal viscosity, a circuit will be completed from the supply line L—1 through the wire 626, the wire 662, the wire 672, the switch 410 or the switch 416, the wire 670, the normally closed switch 454, and the wire 658 to the solenoid 664, and from the solenoid to the supply line L—2 through the wire 666. Upon energization of the solenoid 664, the locking circuit for this solenoid will be completed from the supply line L—1 through the wire 626, the wire 662, contact 678, the switch arm 682, contact 676, the wire 674, the wire 670, the normally closed switch 454, and the wire 668 to the solenoid 664, and from the solenoid to the supply line L—2 through the wire 666. Also, upon energization of the solenoid 664 by the closing of either of the switches 410 and 416 a circuit will be completed from the supply line L—1 to the gate actuating solenoids 430 and 432 through the wires 626 and 662 to the contact 660 and through the switch arm 680 to the contact 656, and by the wire 654 to the common connection to the gate actuating solenoids, and through the solenoids and by the wire 652 to the supply line L—2. The self-locking relay 658 will be maintained energized by its locking circuit until the can actuated switch 454 has been moved to open position due to the passage of a defective can through the gate bars 434 and 436 and into the rejecting channel 452. Upon the breaking of this locking circuit the usual spring 684 acting on the core of the solenoid 664 returns the switch arms 680 and 682 to open circuit position, thereby de-energizing the gate actuating solenoids 432 and 430, and also further breaking the locking circuit of the self-locking relay 658 at the contact points 676 and 678.

*Operation of the machine*

In operation, cans on the supply table 26 are fed by the elevator belt 30 to the gravity track or conveyor 36 by which they are fed into the control mechanism or track 4 and along the rails 52 of which (Figure 10) the cans roll into the size-testing mechanism 6. Cans of abnormal length cannot pass between the rotating disks 84 of this size-testing mechanism and are, therefore, carried by the peripheral portion 94 of these disks upwardly and deposited on the inclined storage track 98. Cans of normal length roll freely between these disks 84 onto the rails 106, by which they are fed into the pressure-testing mechanism 8. Filled cans which are defective in respect to the abnormality of the pressure of their contents, or which are defective in other respects as evidenced by the abnormality of their end contours, are detected in this mechanism. Such defective cans are directed or fed into the rejecting channel 350 (Figure 13) through the can-directing or rejecting means 10, the operation of which is determined, as previously described, by the pressure-testing mechanism 8. Cans of normal internal pressure and end contour freely roll or pass through the gates of the can-directing or rejecting means 10 and are fed along the gravity track 348 into the viscosity-testing mechanism 12. Every filled can, passing into the viscosity-testing mechanism 12, is first rotated in one direction and then fed onto the gravity track section along which the cans tend to rotate in a direction opposite to the previous direction of rotation of the can and opposite to the direction of rotation of the contents of the can, so that cans are projected from the end of the gravity track section at different speeds and different trajectories in accordance with the viscosity of the can contents.

Cans, the contents of which are of abnormal viscosity, operate the controlling members 406 and 408 which determine the operation of the can-directing or rejecting means 14. This can-directing or rejecting means 14, as previously described, determines the rejection of cans of abnormal viscosity, while allowing cans of normal viscosity to pass freely through its gates 434 and 436 to the gravity-feeding track section 450 by which the cans are fed as shown in Figure 1 to one end of the conveyor 472 of the inspection table 18.

In the manner previously described, the cans are withdrawn from, weighed, and return to the inspection table 18. In passing through the weighing mechanism 16 filled cans which are below the normal weight are rejected, but the filled cans of normal weight are allowed to pass therethrough. At the inspection table beyond the weighing mechanism 16, an operator inspects the cans for defects not detectable by the previous mechanisms such, for example, as dirty or rusty cans or cans defective in some other unusual way. The switches 608 and 610, controlled by the resilient side guide 600, render the pressure-testing mechanism 8 and the weight-testing mechanism 16 inoperative if, by reason of accumulation, the cans become jammed on the inspection table. From the inspection table the cans are fed by way of the twisted gravity track section 616 to the elevator 20 by which the satisfactory and normal cans may be conveyed to labelling or packaging machines, or to further processing or testing machines as may be desired.

It will be evident from the foregoing description that applicant has provided a method and apparatus for successfully and satisfactorily detecting mashed cans or cans which are longer than normal; for detecting bloated cans or cans having abnormal internal pressures as evidenced by their end contours; for detecting cans of which the contents are of an abnormal viscosity; for detecting filled cans which are below normal weight; for rejecting abnormal cans detected by the various operations or apparatus; and for accompanying these testing and rejecting functions in a given sequence, insuring the maximum efficiency in the performance of each function.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A method of handling filled containers which comprises moving the containers along a given path, testing the containers for length and discharging those of abnormal length, testing the remaining containers for internal pressure by determining the contour of the ends thereof, discharging those of abnormal internal pressures and directing along said path those of normal internal pressures, testing the containers of normal internal pressures for viscosity of their contents and discharging those of which the contents are of abnormal viscosity, and testing for weight the containers which have passed the length, pressure and viscosity tests and discharging those of abnormal weight.

2. A method of handling filled cans which comprises feeding cans to be tested along a given path, testing the cans and removing cans of abnormal length, testing the remaining cans for internal pressure by determining the contour of the ends thereof, removing therefrom those having abnormal internal pressures and directing along said path those of normal internal pressures and testing the cans still remaining for the viscosity of their contents and removing therefrom those the contents of which are of abnormal viscosity.

3. A method of handling filled containers which comprises feeding the filled containers to be tested along a given path, testing the containers for internal pressure by determining the contour of the ends thereof, removing therefrom those of abnormal internal pressures and directing along said path those of normal internal pressure and testing the remaining containers for the viscosity of their contents and removing therefrom the containers the contents of which are of abnormal viscosity.

4. A method of testing filled cans which comprises feeding the cans to be tested along a given path, testing the cans for internal pressure by determining the contour of the ends thereof, removing therefrom those of abnormal internal pressures and directing along said path those of normal internal pressures, testing the cans of normal internal pressure for the viscosity of their contents and removing cans the contents of which are of abnormal viscosity, and testing for weight the cans of normal internal pressure and viscosity and removing cans of abnormal weight.

5. A method of determining the viscosity of the contents of a filled container, which comprises applying a predetermined force to rotate the container against the inertia of its contents, and utilizing, as a measure of the viscosity of such contents, the retardation of the continued rotation of the container by the retarding force of the inertia of the contents.

6. A method of separating filled containers according to the viscosity of their contents, which comprises applying a predetermined force to rotate each container against the inertia of its contents, and sorting the containers in accordance with the retardation of the continued rotation of each container by the retarding force exerted upon each container by the inertia of its contents.

7. A method of separating filled cans according to the viscosity of their contents, which comprises first rotating the can and its contents to impart rotation to the contents at a definite rate in one direction, then applying a predetermined force to rotate the can in a direction opposite to the direction to which its contents tend to continue rotation, and sorting the cans in accordance with the retarding force exerted on each can by its contents.

8. A method of separating filled cans according to the viscosity of their contents, which comprises first rotating the can and its contents to impart rotation to the contents in one direction, then rotating the can in a direction opposite to the direction to which its contents tend to continue rotation, projecting each can through a trajectory determined by the retarding force exerted on the can by its contents, and sorting the cans in accordance with the angles of their projection.

9. A mechanism for sorting filled cans in respect to the viscosity of their contents, which comprises means for first rotating each can and its contents in one direction at a definite rate and then applying a predetermined force to rotate the can in the opposite direction while the contents continue to rotate in the original direction, and means for sorting the filled cans in accordance with the retarding force exerted on the cans by the contents thereof.

10. A mechanism for separating filled cans according to the viscosity of their contents, which comprises means for spinning the filled can first in one direction and then in the other, means for projecting the cans along trajectories varying automatically in accordance with the viscosity of their contents, and means for sorting the filled cans in accordance with their trajectories.

11. A machine for testing filled cans and for rejecting defective cans, said machine comprising can-projecting means for causing abnormal cans to follow different space trajectories than normal cans, means receiving the cans from the projecting means and selectively directing said normal cans and said abnormal cans along different paths, electrical switch means instantaneously operated by the cans as they move through said trajectories, said can-directing means including an electrically operable can-directing member, self-locking electrically operable means for maintaining said member in one position following the instantaneous operation of said switch means, and means engaged by the cans moving along one path after having passed the can-directing member for disabling said self-locking electrically operable means to cause the member to move to another position to direct cans in another direction.

12. A machine for handling filled containers, which comprises means for feeding the containers along a given path, means for testing the containers for length and for directing those of abnormal length in one direction and those of normal length in another direction, means operatively associated with said first testing means for testing the end contour of the containers of normal length to determine the internal pressure of their contents, means for discharging those containers the contents of which are at abnormal internal pressures in a direction different than the containers the contents of which are at normal internal pressures, means operatively associated with said pressure testing means receiving said container of normal pressure for testing the containers in respect to the viscosity of their contents, means operatively controlled by said last-mentioned testing means for directing the containers the contents of which are of abnormal viscosity in one direction and those containers in which the contents are of normal viscosity in another direction, means at a fourth station receiving the filled containers which have satisfactorily passed the previous tests for weighing said tested containers and discharging those of abnormal weight in one direction and those of normal weight in another direction.

13. A machine for handling filled containers which comprises means for feeding the containers along a given path, means at a first station for testing the containers for length and for discharging those of abnormal length in one direction and those of normal length in another direction, and means at a second station receiving the cans of normal length from said first testing means for testing the end contour of the received containers to determine the internal pressures of their contents, means operatively controlled by said last-mentioned testing means for separating the containers the contents of which are of abnormal internal pressures from containers the contents of which are of normal pressures, means at a third station receiving the containers the contents of which are at normal pressures from said second testing means for testing the containers in respect to the viscosity of their contents, and means operatively controlled by said last-mentioned testing means for separating the containers the contents of which are of abnormal viscosity from the containers the contents of which are of normal viscosity.

14. A machine for inspecting filled containers in respect to the viscosity of their contents, which comprises means for applying a predetermined force to rotate the container against the inertia of its contents, and means responsive to the retardation of the continued rotation of the container by the retarding force exerted by the inertia of the contents on its container for separating containers the contents of which are of abnormal viscosity from containers the contents of which are of normal viscosity.

15. A method of testing filled cans which comprises feeding the cans to be tested along a given path, testing the cans for internal pressure by determining the contour of the ends thereof, removing therefrom those of abnormal internal pressures and directing along said path in spaced succession those of normal internal pressures, testing the cans of normal internal pressures for the viscosity of their contents and removing cans, the contents of which are of abnormal viscosity, and testing for weight the cans of normal internal pressure and viscosity and removing cans of abnormal weight.

16. A method of separating filled cans according to the viscosity of their contents, which comprises first rotating the can and its contents to impart rotation to the contents in one direction, then rotating the can along a track in a direction opposite to the direction in which its contents tend to continue rotation, projecting each can from said track through a trajectory determined by the retarding force exerted on the can by its contents, and sorting the cans in accordance with the angles of their projection.

17. A method of separating filled cans according to the viscosity of their contents, which comprises first rotating the can and its contents to impart rotation to the contents in one direction, then rotating the can by gravity in a direction opposite to the direction in which its contents tend to continue rotation, projecting each can through a trajectory determined by the retarding force exerted on the can by its contents, and sorting the cans in accordance with the angles of their projection.

18. A method of separating filled cans according to the viscosity of their contents, which comprises first rotating the can and its contents to impart rotation to the contents in one direction, then rotating the can in a direction opposite to the direction in which its contents tend to continue rotation, projecting each can through a trajectory determined by the retarding force exerted on the can by its contents, and directing cans of a predetermined trajectory, corresponding to a desired viscosity, in one direction and those of greater and less trajectories, corresponding to undesired viscosities, in a different direction.

19. A method of separating filled cans according to the viscosity of their contents, which comprises first rotating the can and its contents to impart rotation to the contents in one direction, then rotating the can in a direction opposite to the direction in which its contents tend to continue rotation, projecting each can through a trajectory determined by the retarding force exerted on the can by its contents, the trajectory of a can, the contents of which are of a desired viscosity, lying between a pair of switch means disposed, respectively, thereabove and therebelow, said switch means both controlling mechanism for discarding cans which actuate either of said switches whereby cans of desired viscosity are passed on and others are discarded.

20. A machine for testing filled cans and for rejecting defective cans, said machine comprising electrical switch means actuated only by cans having contents of abnormal viscosity, and can-directing means receiving the cans after they pass said switch means, said can-directing means including an electrically operable can-directing member, self-locking, electrically operable means for maintaining said member in one position following the instantaneous operation of said switch means, and means engaged by the cans moving along one path after having passed the can-directing member for disenabling said self-locking, electrically operable means to cause the member to move to another position to direct cans in another direction.

21. A machine for testing filled cans and for rejecting defective cans, said machine comprising can-projecting means for causing cans to follow different space trajectories, depending upon whether the viscosity of the contents of the can is normal or abnormal, means receiving the cans from the projecting means and selectively directing said normal viscosity cans along one path and said abnormal viscosity cans along another, electrical switch means instantaneously operated by the abnormal viscosity cans as they move through said spaced trajectories, said can-directing means including an electrically operable can directing member, self-locking, electrically operable means for maintaining said member in one position following the instantaneous operation of said switch means, and means engaged by the cans moving along one path after having passed the can-directing member for disenabling said self-locking, electrically operable means to cause the member to move to another position to direct cans in another direction.

22. A mechanism for separating filled cans according to the viscosity of their contents, which comprises means for spinning the filled can first in one direction and then in the other, means for projecting the cans along trajectories varying automatically in accordance with the viscosity of their contents, and means receiving the cans so projected for directing the cans of predetermined trajectory, corresponding to normal viscosity, in one direction and those of different trajectory, corresponding to abnormal viscosity, in a different direction.

23. A mechanism for separating filled cans according to the viscosity of their contents, which comprises means for spinning the filled can first in one direction and then in the other, means for projecting the cans along trajectories varying automatically in accordance with the viscosity of their contents, and means for directing in one direction cans, the trajectories of which correspond to normal viscosity, and for directing other cans in a different direction, said means for reversing the direction of spin of said cans including a downwardly inclined track whereby the force of gravity is utilized to produce said reverse spin.

24. A mechanism for separating filled cans according to the viscosity of their contents, which comprises means for spinning the filled can first in one direction and then in the other, means for projecting the cans along trajectories varying automatically in accordance with the viscosity of their contents, and means for directing in one direction cans, the trajectories of which correspond to normal viscosity, and for directing other cans in a different direction, said means for reversing the direction of spin of said cans including a downwardly inclined track whereby the force of gravity is utilized to produce said reverse spin, and said means for projecting the cans including an upwardly inclined track section forming with said gravity track section a continuously curving track.

25. A mechanism for separating filled cans according to the viscosity of their contents, which comprises means for spinning the filled can first in one direction and then in the other, means for projecting the cans along trajectories varying automatically in accordance with the viscosity of their contents, electrical switch means in the paths of cans having trajectories corresponding to abnormal viscosities, and means controlled by said switch means for directing cans of normal viscosity along one path and cans of abnormal viscosity along a different path.

26. In a machine for testing cans, an automatic mechanism for detecting defective cans, including in order an end content tester, a viscosity tester, a weight tester, and conveying mechanism receiving cans from said weight tester, control mechanism associated with said conveying mechanism and including switch means operated by cans carried by said conveying mechanism for rendering said automatic mechanism inoperative upon accumulation of an excessive number of cans in the conveying mechanism, said switch means including a normally closed switch and a normally open switch, said normally closed switch being operative to cut off the power supply to said weight tester and said normally open switch being operative to disengage a clutch mechanism driving said end contour tester whereby said automatic mechanism is rendered inoperative without stopping said viscosity tester.

27. A method of handling filled containers which comprises moving the containers along a given path, testing the containers for length and discharging those of abnormal length, testing the remaining containers for internal pressure by determining the contour of the ends thereof, discharging those of abnormal internal pressures and directing along said path in spaced succession those of normal internal pressures, testing the containers of normal internal pressures for viscosity of their contents by applying a predetermined force to rotate the container against the inertia of its contents and utilizing as a measure of the viscosity of such contents the retardation of the continued rotation of the container by the retarding force of the inertia of the contents and discharging those of which the contents are of abnormal viscosity, and testing for weight the containers which have passed the length, pressure and viscosity tests and discharging those of abnormal weight.

28. A method of handling filled cans which comprises feeding cans to be tested along a given path, testing the cans and removing cans of abnormal length, testing the remaining cans for internal pressure by determining the contour of the ends thereof, removing therefrom those having abnormal internal pressures and directing along said path in spaced succession those of normal internal pressure and testing the cans still remaining for the viscosity of their contents by first rotating the can and its contents to impart rotation to the contents at a definite rate in one direction, then applying a predetermined force to rotate the can in a direction opposite to the direction to which its contents tend to continue rotation and removing therefrom those cans the contents of which are of abnormal viscosity as indicated by the retardation of the continued rotation of the cans by the retarding force of the inertia of the contents.

29. A method of handling filled containers which comprises feeding the filled containers to be tested along a given path, testing the containers for internal pressure by determining the contour of the ends thereof, removing therefrom those of abnormal internal pressures and directing along said path in spaced succession those of normal internal pressure and testing the remaining containers for the viscosity of their contents by applying a predetermined force to rotate the container against the inertia of its contents and utilizing as a measure of the viscosity of said contents the retardation of the continued rotation of the container by the retarding force of the inertia of the contents and removing therefrom the containers, the contents of which are of abnormal viscosity.

30. A machine for handling filled containers which comprises means for feeding the containers along a given path, means at a first station for testing the end contour of the containers to determine the internal pressure of their contents, means operatively controlled by said testing means for separating the containers, the contents of which are of abnormal internal pressures from containers the contents of which are of normal pressures, means at a second station receiving the containers the contents of which are at normal pressures from said first testing means for testing the containers in respect to the viscosity of their contents, and means operatively controlled by said last-mentioned testing means for separating the containers the contents of which are of abnormal viscosity from the containers the contents of which are of normal viscosity.

31. A machine for handling filled containers, which comprises means for feeding the containers along a given path, means for testing the containers for length and for directing those of abnormal length in one direction and those of normal length in another direction, means operatively associated with said first testing means for testing the end contour of the containers of normal length to determine the internal pressure of their contents, means for discharging those containers the contents of which are at abnormal internal pressures in a direction different than the containers the contents of which are at normal internal pressures, means operatively associated with said pressure testing means receiving said containers of normal pressure in spaced succession for testing the containers in respect to the viscosity of their contents, said viscosity testing means including means for applying a predetermined force to rotate each container against the inertia of its contents and means for utilizing as a measure of the viscosity of such contents the retardation of the continued rotation of the container by the retarding force of the inertia of the contents, means operatively controlled by said last-mentioned viscosity testing means for directing the containers the contents of which are of abnormal viscosity in one direction and those containers in which the contents are of normal viscosity in another direction, means at a fourth station receiving the filled containers which have satisfactorily passed the previous tests for weighing said tested containers and discharging those of abnormal weight in one direction and those of normal weight in another direction.

32. A machine for handling filled containers which comprises means for feeding the containers along a given path, means at a first station for testing the containers for length and for discharging those of abnormal length in one direction and those of normal length in another direction, and means at a second station receiving the cans of normal length from said first testing means for testing the end contour of the received containers to determine the internal pressures of their contents, means operatively controlled by said last-mentioned testing means for separating the containers the contents of which are of abnormal internal pressures from containers the contents of which are of normal pressures, means at a third station receiving the containers the contents of which are at normal pressures in spaced succession from said second testing means for testing the containers in respect to the viscosity of their contents, said means at said third station including means for first rotating each container and its contents to impart rotation to the contents at a definite rate in one direction and then applying a predetermined force to rotate the container in a direction opposite to the direction to which its contents tend to continue rotation and means for utilizing as a measure of the viscosity of such contents the retardation of the continued rotation of the container by the retarding force of the inertia of the contents and means operatively controlled by said last-mentioned viscosity testing means for separating the containers the contents of which are of abnormal viscosity from the containers the contents of which are of normal viscosity.

33. A machine for handling filled containers which comprises means for feeding the containers along a given path, means at a first station for testing the end contour of the containers to determine the internal pressure of their contents, means operatvely controlled by said testing means for separating the containers the contents of which are of abnormal internal pressures from containers the contents of which are of normal pressures, means at a second station receiving the containers the contents of which are at normal pressures in spaced succession from said first testing means for testing the containers in respect to the viscosity of their contents, said viscosity testing means including means for applying a predetermined force to rotate each container against the inertia of its contents and means for utilizing as a measure of the viscosity of such contents the retardation of the continued rotation of the container by the retarding force of the inertia of the contents, and means operatively controlled by said last-mentioned viscosity testing means for separating the containers the contents of which are of abnormal viscosity from the containers the contents of which are of normal viscosity.

34. A method of separating filled cans according to the viscosity of their contents, which comprises applying a predetermined force to rotate the can against the inertia of its contents, projecting each can through a trajectory determined by the retardation of the continued rotation of the can by the retarding force of the inertia of the contents, and sorting the cans in accordance with the angles of their projection.

35. A mechanism for testing a succession of relatively small filled containers in respect to the viscosity of their contents, which comprises container receiving means for moving each filled container first in one direction and then in another to cause movement of said container and its contents relatively in opposite directions, and means for utilizing, as a measurement of the viscosity of such contents, the effect produced on the movement of the container by the opposite movement of its contents.

36. A method of determining the viscosity of the contents of a succession of relatively small filled containers which comprises applying in succession to the containers a predetermined movement compelling force for a given distance to initiate movement of each container and its contents, applying a second predetermined force to each container in such a manner as to change the velocity of the container, and utilizing, as a measurement of the viscosity of such contents, the effect produced on the velocity of the container by the change-opposing force frictionally exerted by the contents on the inner surface of the container.

37. A method of handling filled containers which comprises moving the containers along a given path, testing the containers for length and discharging those of abnormal length, testing the remaining containers for internal pressures by determining the contour of the ends thereof, discharging those of abnormal internal pressures and directing along said path in spaced succession those of normal internal pressures, testing the containers of normal internal pressures for viscosity of their contents, by applying a predetermined force to move the container relative to its contents and utilizing, as a measurement of the viscosity of such contents, the effect produced on the continued movement of the container by the force exerted by the contents on the container and discharging those of which the contents are of abnormal viscosity, and testing for weight the containers which have passed the length, pressure and viscosity tests and discharging those of abnormal weight.

38. A method of handling filled cans which comprises feeding cans to be tested along a given path, testing the cans and removing cans of abnormal length, testing the remaining cans for internal pressure by determining the contour of the ends thereof, removing therefrom those having abnormal internal pressures and directing along said path in spaced succession those of normal internal pressures and testing the cans still remaining for the viscosity of their contents by applying a predetermined force to move the container relative to its contents and utilizing, as a measurement of the viscosity of such contents, the effect produced on the continued movement of the container by the force exerted by the contents on the container, and removing therefrom the containers the contents of which are of abnormal viscosity.

39. A method of handling filled containers, which comprises feeding the filled containers to be tested along a given path, testing the containers for internal pressure for determining the contour of the ends thereof, removing therefrom those of abnormal internal pressures and directing along said path in spaced succession those of normal internal pressures and testing the remaining containers for the viscosity of their contents by applying a predetermined force to move the container relative to its contents and utilizing, as a measurement of the viscosity of such contents, the effect produced on the continued movement of the container by the force exerted by the contents on the container, and removing therefrom the containers the contents of which are of abnormal viscosity.

40. A machine for handling filled containers, which comprises means for feeding the containers along a given path, means for testing the containers for length and for directing those of abnormal length in one direction and those of normal length in another direction, means operatively associated with said first testing means for testing the end contour of the containers of normal length to determine the internal pressure of their contents, means for discharging from said path those containers, the contents of which are of abnormal internal pressures and for directing along said path in spaced succession the containers the contacts of which are at normal internal pressures, means operatively associated with said pressure testing means receiving said containers of normal pressures in spaced succession for testing the containers in respect to the viscosity of their contents, said viscosity testing means including means for applying a predetermined force to move the container relative to its contents, and means for utilizing, as a measurement of the viscosity of such contents, the effect produced on the continued movement of the container by the force exerted by the contents on the container, means operatively controlled by said last mentioned testing means for directing the containers the contents of which are of abnormal viscosity in one direction and those containers in which the contents are of normal viscosity in another direction, means at a fourth station receiving the filled containers which have satisfactorily passed the previous tests for weighing said tested containers and discharging those of abnormal weight in one direction and those of normal weight in another direction.

41. A machine for handling filled containers, which comprises means for feeding the containers along a given path, means at a first station for testing the containers for length and for discharging those of abnormal length in one direction and those of normal length in another direction, means at a second station receiving the cans of normal length from said first testing means for testing the end contour of the received containers to determine the internal pressures of their contents, means operatively controlled by said last mentioned testing means for discharging from said path those containers the contents of which are at abnormal internal pressures and for directing along said path in spaced succession the containers the contents of which are of normal pressures, means at a third station receiving the containers, the contents of which are at normal pressures in spaced succession from said second testing means for testing the containers in respect to the viscosity of their contents, said viscosity testing means including means for applying a predetermined force to move the container relative to its contents, and means for utilizing, as a measurement of the viscosity of such contents, the effect produced on the continued movement of the container by the force exerted by the contents on the container and means operatively controlled by said last mentioned testing means for separating the containers the contents of which are of abnormal viscosity from the containers the contents of which are of normal viscosity.

42. A machine for handling filled containers, which comprises means for feeding the filled containers along a given path, means at a first station for testing the end contour of the containers to determine the internal pressure of their contents, means operatively controlled by said testing means for discharging from said path those containers the contents of which are of abnormal internal pressures and for directing along said path in spaced succession the containers the contents of which are at normal internal pressures, means at a second station receiving in spaced succession the containers the contents of which are at normal pressures from said first testing means for testing the containers in respect to the viscosity of their contents, said viscosity testing means including means for applying a predetermined force to move the container relative to its contents, and means for utilizing, as a measurement of the viscosity of such contents, the effect produced on the continued movement of the container by the force exerted by the contents on the container and means operatively controlled by said last named testing means for separating the containers the contents of which are of abnormal viscosity from the containers the contents of which are of normal viscosity.

43. A machine for handling filled containers, which comprises means for feeding the containers along a given path, means at a first station for testing the containers for length and for discharging those of abnormal length from said path and directing along said path those of normal length, and means at a station further along said path receiving cans remaining on said path for testing the containers in respect to the viscosity of their contents, and means operatively controlled by said last mentioned testing means for separating the containers the contents of which are of abnormal viscosity, from containers the contents of which are of normal viscosity.

44. A mechanism for separating filled cans according to the viscosity of their contents, which comprises means for first rotating the filled can and its contents to impart rotation to the contents in one direction, means receiving cans so rotated for rotating the can by gravity in a direction opposite to the direction in which its contents tend to continue rotation, means receiving the cans from said last named means for projecting the cans along trajectories determined by the retarding force exerted on the can by its contents, and means for sorting the cans in accordance with their trajectories.

45. A mechanism for testing a succession of relatively small, filled containers in respect to the viscosity of their contents, which comprises means for applying in succession to the containers a predetermined movement impelling force for a given distance to initiate movement of each container and its contents, means for applying to each container, the movement of which has been initiated by said first means, a second predetermined force in such a manner as to change the velocity of the container, and means operatively associated with said last mentioned means for utilizing as a measure of the viscosity of the contents of the container the effect produced on the velocity of the container by the change opposing force frictionally exerted by the contents on the inner surface of the container.

ROY O. HENSZEY.
PAUL SMART.

CERTIFICATE OF CORRECTION.

Patent No. 2,339,638.                                          January 18, 1944.

ROY O. HENSZEY, ET AL.

It is hereby certified that error appears in the printed specification of the above numbered patent requiring correction as follows: Page 4, first column, line 49-50, for "members 194" read --members 104--; and second column, line 49, for the word "cam" read --can--; page 6, second column, line 55-56, for "annulus 20" read --annulus 320--; page 8, second column, line 49, for "cam" read --can--; page 12, first column, line 30, for "return" read --returned--; page 13, first column, line 62, for "container" read --containers--; page 14, second column, line 45, for "content" read --contour--; page 16, second column, line 9, for "the containers" read --those--; and that the said Letters Patent should be read with this correction therein that the same may conform to the record of the case in the Patent Office.

Signed and sealed this 28th day of March, A. D. 1944.

Leslie Frazer
Acting Commissioner of Patents.

(Seal)